United States Patent [19]

Murakami et al.

[11] Patent Number: 4,988,837
[45] Date of Patent: Jan. 29, 1991

[54] POSITION DETECTING DEVICE

[75] Inventors: Azuma Murakami; Tsuguya Yamanami; Takahiko Funahashi; Toshiaki Senda; Kazuo Aoki; Keiichi Siguyama; Nobuyuki Miyamori; Akio Kikuchi; Manabu Abe, all of Saitama, Japan

[73] Assignee: Wacom Co., Ltd., Saitama, Japan

[21] Appl. No.: 516,866

[22] Filed: Apr. 30, 1990

Related U.S. Application Data

[63] Continuation of Ser. No. 283,713, Dec. 13, 1988.

[30] Foreign Application Priority Data

Dec. 25, 1987 [JP] Japan .................................. 62-328640
Apr. 15, 1988 [JP] Japan .................................. 63-93219

[51] Int. Cl.⁵ .............................................. G08C 21/00
[52] U.S. Cl. ........................................ 178/18; 178/19; 340/784
[58] Field of Search .................... 178/18, 19; 340/706, 340/784

[56] References Cited

U.S. PATENT DOCUMENTS

| | | | |
|---|---|---|---|
| 4,704,501 | 11/1987 | Taguchi et al. .................. | 178/19 |
| 4,723,836 | 2/1988 | Kono et al. ...................... | 350/331 R |
| 4,730,186 | 3/1988 | Koga ................................ | 178/18 |
| 4,848,496 | 7/1989 | Murakami et al. .............. | 178/19 |
| 4,878,553 | 11/1989 | Yamanami et al. .............. | 178/18 |

Primary Examiner—Stafford D. Schreyer
Attorney, Agent, or Firm—Lowe, Price, LeBlanc, Becker & Shur

[57] ABSTRACT

The position on a surface of an implement including a tuned circuit with a predetermined resonant frequency is determined and displayed by an apparatus having a housing including the surface. A tablet in the housing includes coils arranged in two coordinate directions parallel to the surface. The coils are excited with AC energy having approximately the same frequency as the resonant frequency. The tuned circuit interacts with the AC energy to change the AC current flowing in the coils as a function of the implement on the tablet. An electronic two-coordinate direction display in the housing configured as a plate is superposed with and lies in a plane parallel to the tablet and the surface. The display responds to the change in AC current resulting from the interaction between the AC energy and the tuned circuit to indicate the position of the implement on the surface.

68 Claims, 16 Drawing Sheets

POSITION DETECTING DEVICE

This application is a continuation of application Ser. No. 07/283,713 filed Dec. 13, 1988.

BACKGROUND OF THE INVENTION

1. Field of the Invention

The present invention relates to a position detector which detects a coordinate position designated with a position pointer and which indicates the designated position on a coordinate display.

2. Related Art

A type of position detector is known which is designed to measure, with a processor, the period of time between a moment when a pulse is applied to one end of a magnetostriction transmitting medium or to a drive coil provided at the tip of a position pointer to generate a magnetostriction vibration wave in the magnetostriction transmitting medium and a moment when an induced voltage based on the magnetostriction vibration wave is detected across a detection coil provided at the tip of the position pointer or the end of the magnetostriction transmitting medium, thereby calculating the position designated with the position pointer. In another known position detector, a plurality of drive wires and a plurality of detection wires are arranged to be perpendicular to each other, and currents are successively supplied to the drive wires while the detection wires are successively selected to detect induced voltages, thereby enabling a position designated with a position pointer having a magnetic material such as ferrite to be detected from the position of detection wires from which higher induced voltage are detected.

The former detector is capable of detecting the designated position with comparatively high accuracy, but it requires a cable for exchange of a timing signal and so forth between the position pointer and the processor, and the handling of this detector is therefore considerably restricted. There is another problem in that the position pointer must be used by being maintained so as to be perpendicular to the magnetostriction transmitting medium while being close to the same. The latter device can be designed to make use of a cordless type of position pointer. In the latter device, however, the resolution with which the coordinate position is detected is determined depending upon the interval at which the wires are arranged. It is difficult to improve the resolution because if the interval is reduced in order to improve the resolution, the signal-to-noise ratio and the stability become deteriorated. It is also difficult to detect the position right above the point of intersection of each drive wire and each detection wire. Moreover, the position pointer must be positioned very close the wires.

Examples of position detectors having a display for indicating a designated position are also known: one in which a position detecting section (sensing section) having light transmission properties is superposed on a liquid crystal display; and one in which a liquid crystal display and a back light are superposed on a sensing section.

In the former example, however, it is necessary to space the position detecting section apart from the liquid display by at least 5 mm in order to avoid influence of noise generating from the liquid display. Correspondingly, the input surface of the tablet and the display surface of the liquid crystal display are spaced part from each other, and the operator perceives a difference between the movement of the tip of the position pointer and the locus of the same displayed on the liquid crystal and therefore becomes awkward in inputting operation.

In the latter example, there is a need for bringing the sensing section and the position pointer close to each other for desired coordinate inputting, and the back light and the liquid display are therefore designed to have very small thicknesses. Under this condition, a very thin light element such as an electroluminescent element (hereinafter referred to as "EL element") may be used as the back light but it is difficult to realize a display screen with a sufficient luminance by using the EL element.

SUMMARY OF THE INVENTION

It is an object of the present invention to provide a position detector in which the position has no connection to the other components, which is improved in terms of handling and accuracy with which the a designated position is detected, and in which the results of detection of the position designated with the position pointer is indicated as coordinates corresponding to the coordinates of the designated position.

To attain this object, the present invention provides a position detecting device including a position pointer having a tuning circuit, and a tablet for position detection having an electric wave generating means for generating an electric wave at a frequency equal to the resonance frequency of the tuning circuit and an electric wave detecting means for detecting an electric wave reflected by the tuning circuit, in which coordinate values of a position designated with the position pointer on a position detecting section of the tablet are detected by exchange of electric waves between the position pointer and the tablet, and which is also provided with a display means for displaying the designated position with coordinates corresponding to the above coordinate values.

In accordance with the present invention, an electric wave reflected by the tuning circuit of the position pointer is detected by the electric wave detecting means of the tablet in order to detect a position designated with the position pointer, thereby enabling the position to be detected with improved accuracy. The position pointer can be essentially constituted by the tuning circuit alone, and there is no need for the provision of heavy components including a battery and a magnet as well as a connection cable. The handling is correspondingly improved. No special component parts are needed for the position detecting section, and it is possible to increase the size of the position detecting section to an extent such that the position detecting device can be applied to an electronic chalkboard or the like. Since, on the coordinate display, the position designated with the position pointer is indicated with the same coordinate, thereby enabling coordinate inputting with the locus of the position pointer observed with the eye.

It is another object of the present invention to provide a position detecting device having the above-mentioned advantages and capable of displaying a position designated with the position pointer with higher illumination.

To attain this object, the present invention provides a position detecting device having the above-described construction and also having a back light for illuminating the display from below.

According to the present invention, the position designated with the position pointer can be indicated with high illumination by the effect of the back light, thereby facilitating confirmation of the designated position with the eye.

It is still another object of the present invention to provide a position detecting device is reduced in thickness and improved in terms of handling.

To attain this object, the present invention provides a position detecting device having a transparent position detecting section having a portion which serves as a cover plate, thereby reducing the size of a space needed for the combination of the position detecting section and the display and reducing the overall thickness of the device.

These and other objects, features and advantages of the present invention will become clear from the following description of the preferred embodiments when the same is read in conjunction with the accompanying drawings.

DESCRIPTION OF THE PREFERRED EMBODIMENTS

Figure 1:
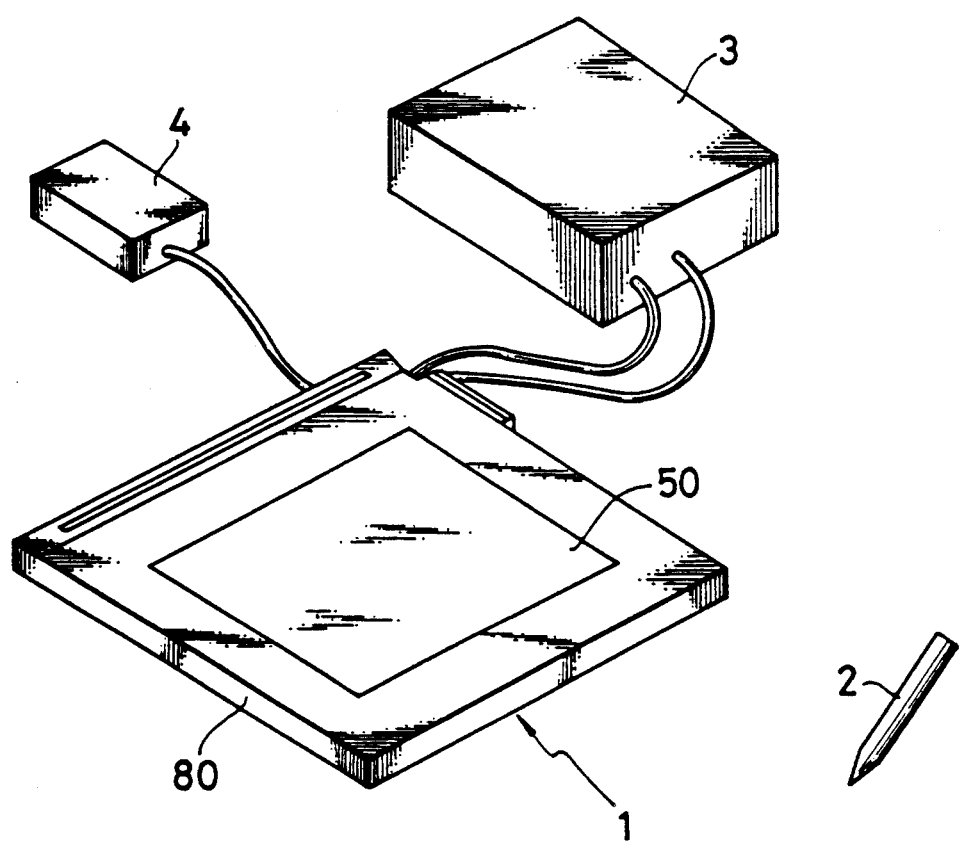
FIG. 1 is a perspective view of a position detecting device in accordance with the present invention schematically illustrating the entire construction of the same.

Referring to FIG. 1, a position detecting device in accordance with the present invention has a tablet 1, a position pointer 2 for designating a position, e.g., a stylus pen (hereinafter referred to simply as "pen"), a controller 3 and a power supply unit 4.

Figure 2:
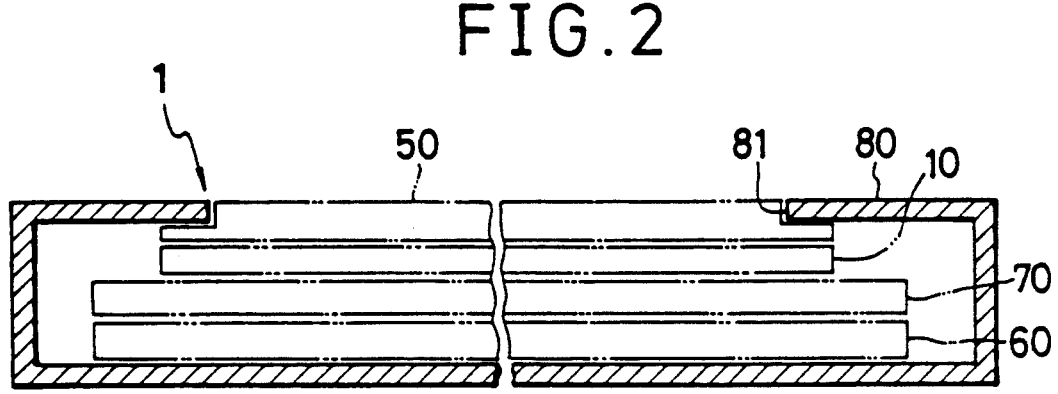
FIG. 2 is a cross-sectional view of a tablet.

Referring then to FIG. 2 which is a cross-sectional view of the structure of the tablet 1, the tablet 1 is constituted by: a sensing section 10 adapted to detect coordinates representing a position designated with the pen 2 in X- and Y-directions position, the sensing section 10 having a transparent base in the form of a plate which will be described later; a flat-type coordinate display panel 50 placed on the sensing section 10 formed of, for example, a transmission type of liquid crystal display panel having an acrylic hard core plate disposed over its upper surface; a back light 60 disposed under the sensing section 10 and has a reflection plate (not shown) for reflecting emitted light toward the liquid display panel 50 placed above the back light 60; a light guide plate 70 such as a milk white acrylic plate disposed between the back light 60 and the sensing section 10 and adapted to enable the whole of the liquid crystal display panel 50 to be illuminated with uniform illuminance distribution; and a non-metallic case 80 having an opening 80 formed in a central portion of its upper wall, the case 80 integrally accommodating the sensing section 10, the liquid crystal display panel 50, the back light 60 and the light guide plate 70.

The back light 60 is designed to improve the liquid crystal display panel 50 in terms of both contrast and illuminance. The back light 60 may be a cold cathode lamp. If a cold cathode lamp is used as the back light 60, the liquid display panel 50 can be illuminated from below at an illuminance at least three-fold higher than that attained by the back light constituted by EL elements.

Figure 3A:
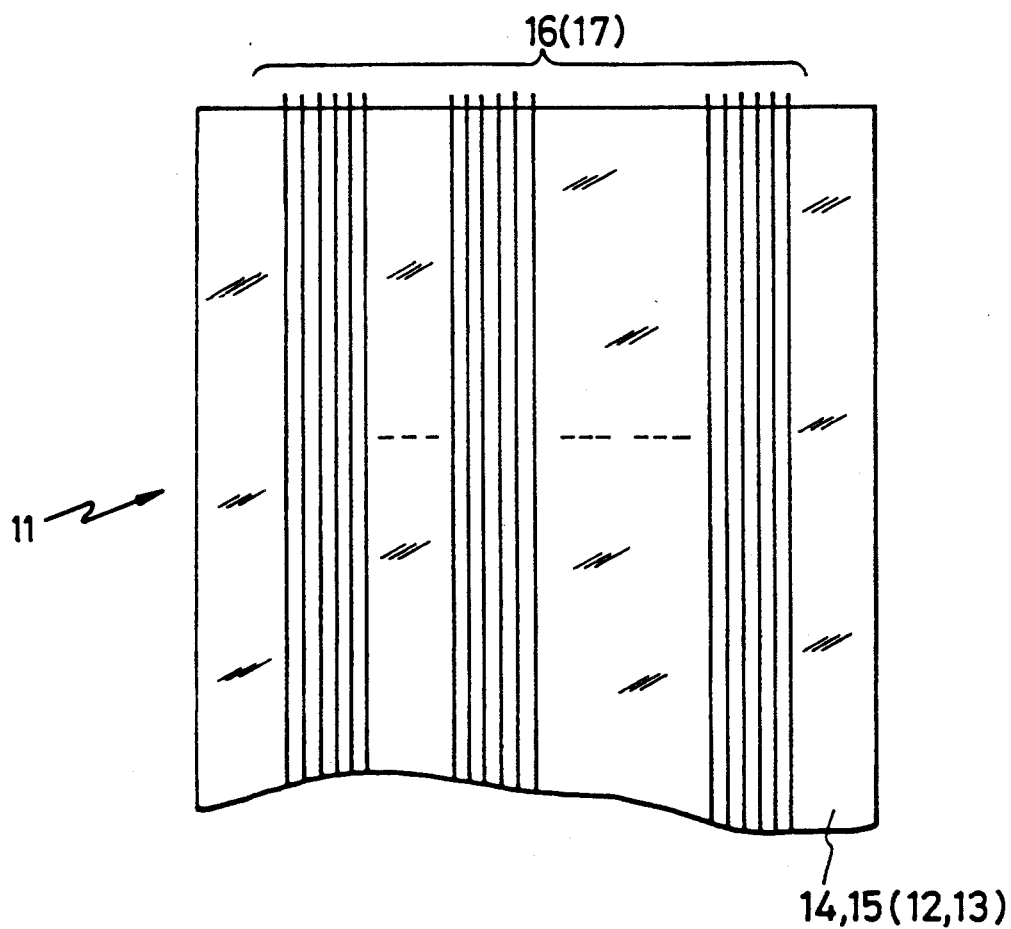
FIG. 3(a) is a schematic illustration of a transparent base of the tablet.
Figure 3B:
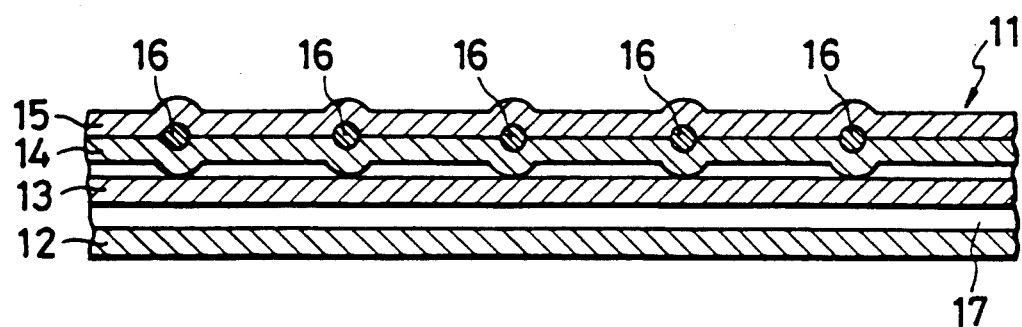
FIG. 3(b) is a fragmentary enlarged cross-section of the transparent base.

FIG. 3(a) schematically shows a transparent base 11 in the form of a plate which constitutes the sensing section 10 of the tablet 1, and FIG. 3(b) shows part of the transparent base 11. As shown in FIGS. 3(a) and 3(b), the base 11 includes transparent films 12, 13, 14, and 15 formed from polyester, polyvinyl chloride, vinyl chloride or the like, multiplicity of copper wires 16 which constitute, for example, 96 parallel lines extending in the Y-direction (which, practically, may be tinned annealed copper wires), and copper wires 17 which similarly constitute 96 parallel lines extending in the X-direction. To form the transparent base 1, the copper wires 17 are first arranged between the transparent films 12 and 13, and these components are bonded with a transparent adhesive, e.g, a polyethylene adhesive. Similarly, the copper wires 16 are arranged between the transparent films 14 and 15, and these components are bonded with the transparent polyethylene adhesive. The transparent films 13 and 14 are then bonded together while the copper wires 16 and 17 are set perpendicular to each other, thus forming the transparent base 11. If the transparent base 11 is irradiated with light emitted from the back light 60 from the side of the transparent film 12 to the side of the transparent film 15, a quantity of light large enough to illuminate the liquid crystal display panel 50 as described above can be obtained at the side of the transparent film 15.

In FIG. 3(b), the surface of the transparent base 11 is illustrated with substantial protrusions, but such unevenness of the surface is negligible since the thickness of half of the base 11, that is, the sum of the diameter of the copper wires in the X- or Y-direction and the thickness of the transparent films between which these wires are sandwiched is at most 0.2 mm.

To constitute the sensing section 10 with the transparent base 11, the transparent base 11 is disposed at the center of a base frame (not shown), and the copper wires 16 and 17 and patterns formed on the base frame are connected to each other by, for example, soldering, thereby forming a multiplicity of loop coils for detecting X- and Y-coordinate values. Portions of the copper wires 16 and 17 exposed outside the transparent base 11 may be coated with an insulating material except for the soldered portions.

Figure 4:
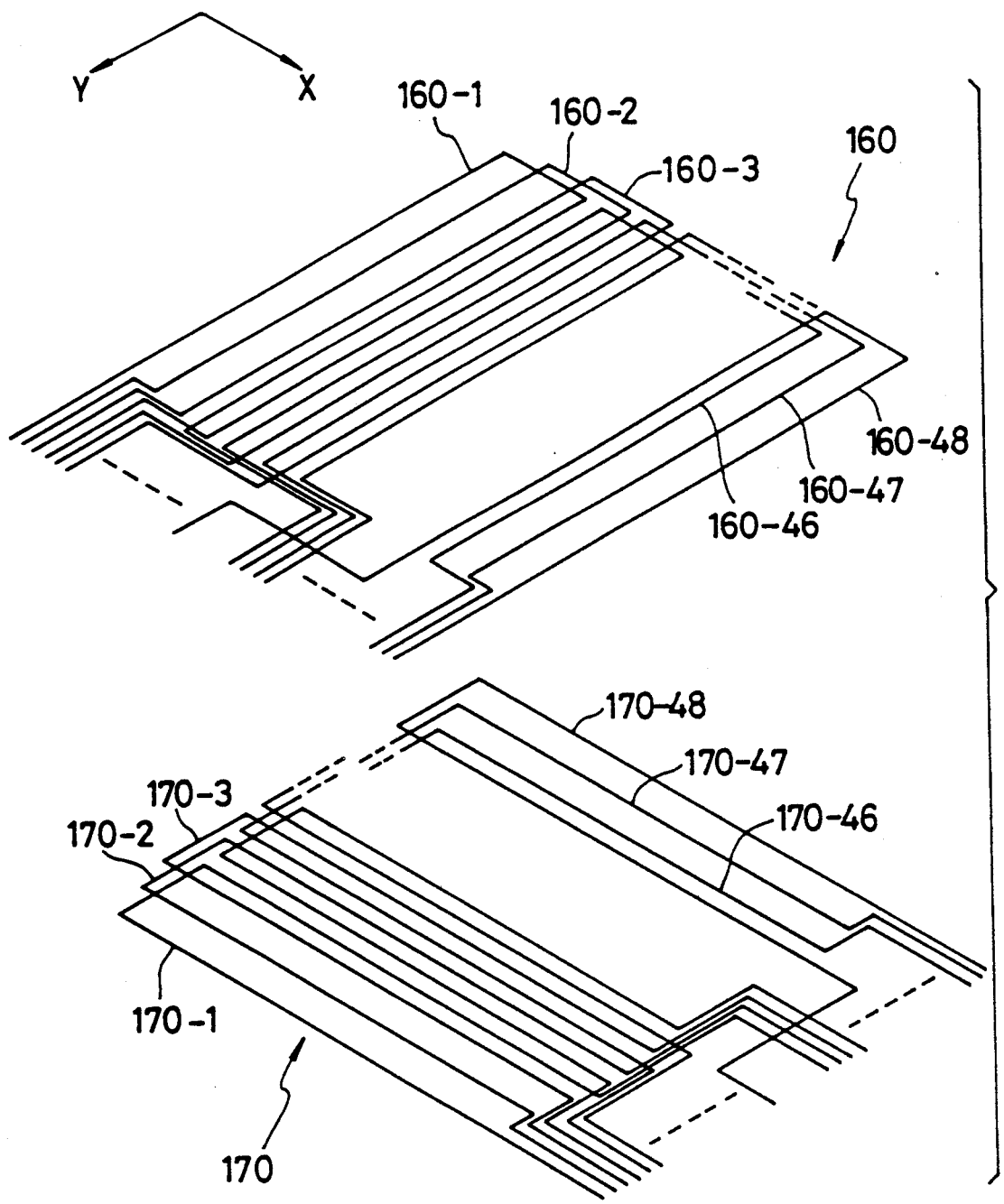
FIG. 4 is a view of details of X-direction and Y-direction loop coil assemblies of the tablet.

FIG. 4 shows details of a loop coil assembly 160 for detecting X-coordinate values and another loop coil assembly 170 for detecting Y-coordinate values. The X-direction loop coil assembly 160 is constituted by a multiplicity of, e.g., 48 loop coils 160-1, 160-2, . . . , 160-48 having major portions arranged in parallel with each other and extending in the Y-direction, and the Y-direction loop coil assembly 170 is similarly constituted by a multiplicity of, e.g., 48 loop coils 170-1, 170-2, . . . , 170-48 having major portions arranged in parallel with each other and extending in the X-direction. As shown in FIG. 3(a), the X-direction loop coil assembly 160 and the Y-direction loop coil assembly 170 are superposed closely one on the other with the transparent films 13 and 14 interposed therebetween. (In the drawings, however, they are illustrated separately for facilitating understanding.) In this arrangement, each loop coil is formed of one turn but it can otherwise be formed of more than two turns as desired.

Figure 5:
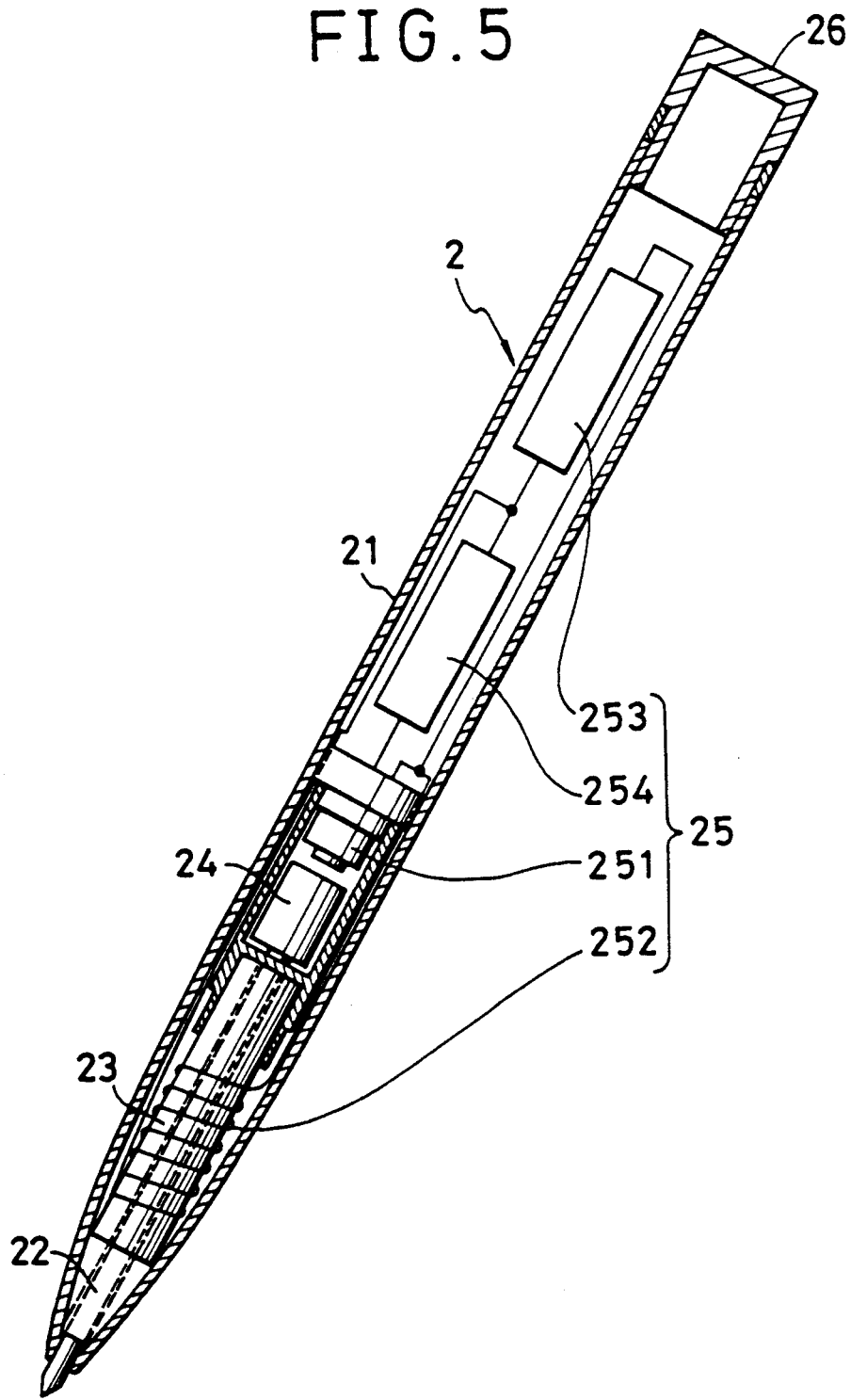
FIG. 5 is a cross-sectional view of a stylus pen.

FIG. 5 shows in section details of the structure of the pen 2. The pen 2 has a penholder 21 formed from a non-metallic material such as a synthetic resin in which are disposed, from the side of the pen tip, a core member 22 such as a refill of a ball-point pen, a ferrite core 23 having a through hole capable of slidably receiving the core member 22, a coil spring 24, a switch 251, a coil 252 wound around the ferrite core 23, a tuning circuit 25 formed of a capacitors 253 and 254. These components are integrally combined and incorporated in the penholder 21. A cap 26 is fitted to the rear end of the penholder 21.

The coil 252 and the capacitor 253 are connected in series with each other, as will be also described in detail with reference to FIG. 7, thereby forming a resonance circuit which is known per se. The inductance of the coil 24 and the capacitance of the capacitor 28 are so determined that the resonance circuit resonates at (tunes with) a predetermined frequency f0 with the voltage and the current being in-phase. The capacitor 254 is connected in parallel with the capacitor 253 via the switch 251 and functions to delay the phase of the current flowing through the resonance circuit and, hence, the phase of a later-mentioned received signal by a predetermined angle when the switch 251 is turned on. To turn on the switch 251, the tip of the core member 22 is forcibly moved into the penholder 21 by, for example, being pressed against the upper surface of the tablet 1 while the penholder 21 is retained by the hand so that it presses the switch 251 by its rear end through the coil spring 24.

Figure 6:
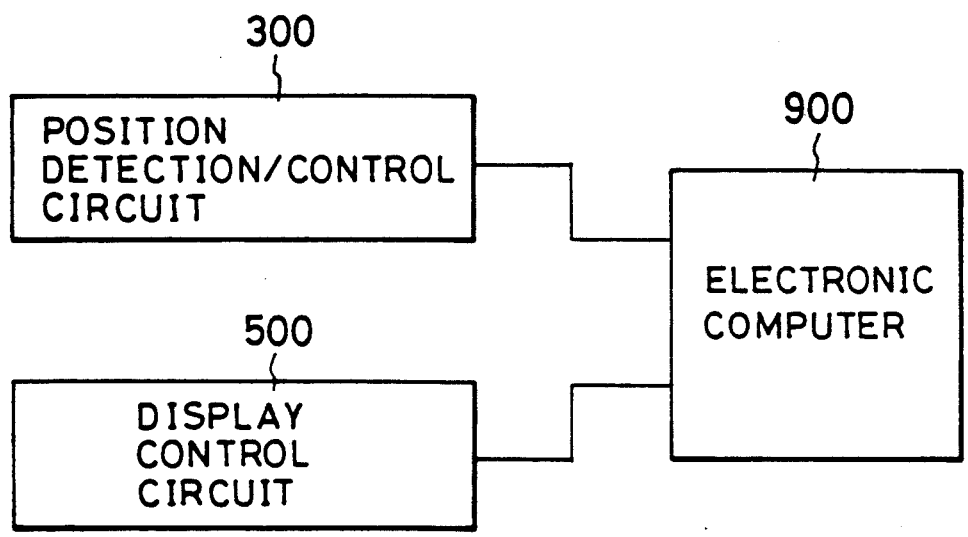
FIG. 6 is a block diagram of a controller.

As shown in FIG. 6, the controller 3 is constituted by a position detection control circuit 300 for controlling the sensing section 10, a display control circuit 500 for controlling the liquid crystal display panel 50 and an electronic computer 900 for effecting overall control of these circuits.

The power supply unit 4 is constituted by a rectifier, a transformer, DC-DC converter and so forth, which components are known per se. The power supply unit 4 supplies electric power to each circuit in the controller 3.

Figure 7:
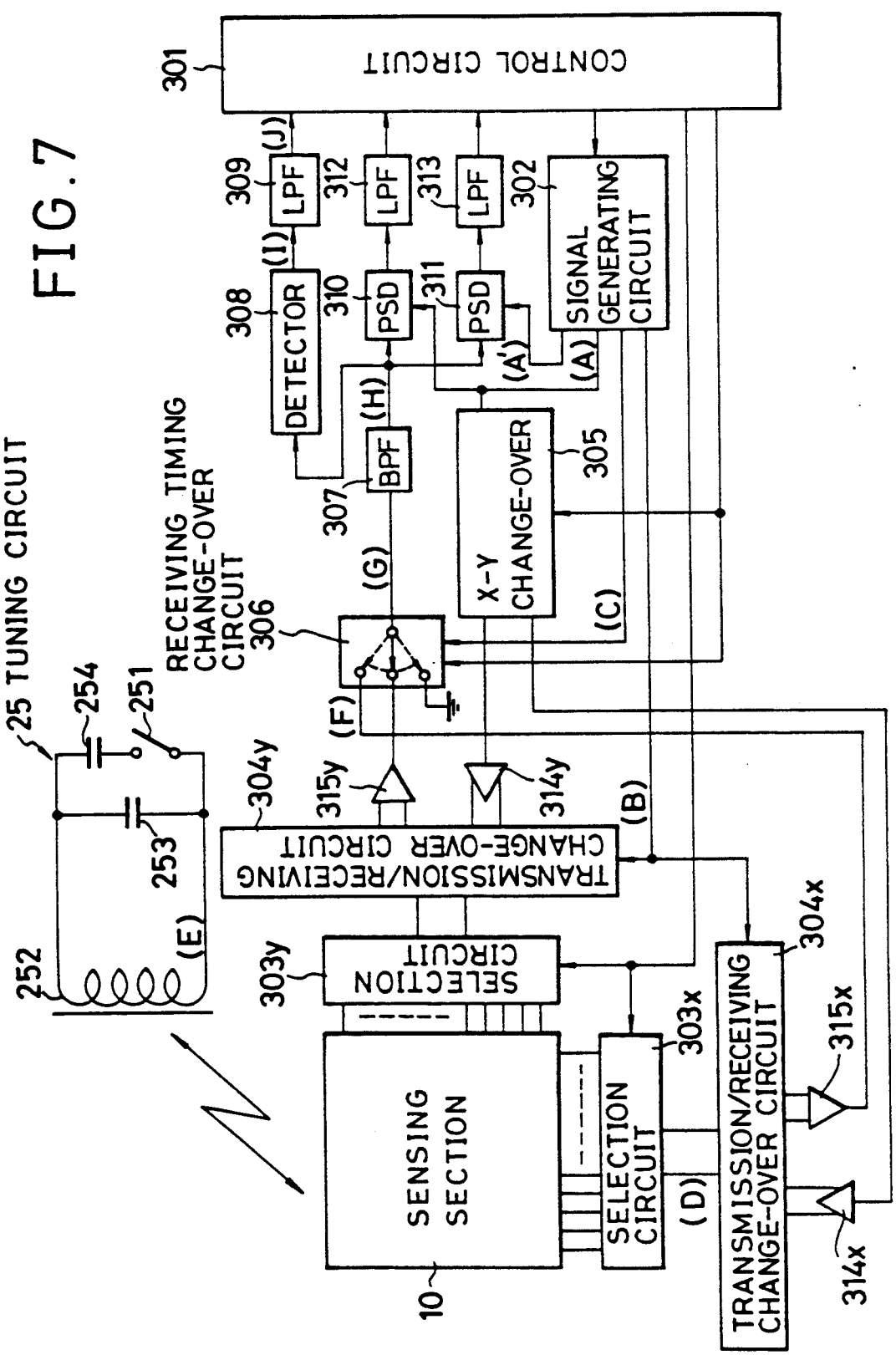
FIG. 7 is a block diagram of details of a tuning circuit of the stylus pen as well as details of a position detection circuit.

FIG. 7 is a block diagram illustrating details of the position detection control circuit 300 as well as the tuning circuit 25. As shown in FIG. 7, the position detection control circuit 300 includes: a control circuit 301; a signal generating means (circuit) 302; X-direction and Y-direction selecting means (circuits) 303x and 303y; a connection change-over means constituted by transmission/receiving change-over circuits 304x and 304y, an X-Y change-over circuit 305 and a receiving timing change-over circuit 306; a signal detecting means constituted by a band-pass filter (BPF) 307; and a coordinate detecting means constituted by a detector 308 and a low-pass filter (LPF) 309. The operation of the coordinate detecting means involves certain processing in the control circuit 301 which will be described later. The position detection control circuit 300 also includes an on/off discriminating means constituted by phase detectors (PSD) 310 and 311 and low-pass filters (LPF) 312 and 313. The operation of the on/off discriminating means involves certain processing in the control circuit 301 which will also described later. The position detection control circuit 300 further includes drive circuits 314x and 314y and amplifiers 315x and 315y.

Figure 8:
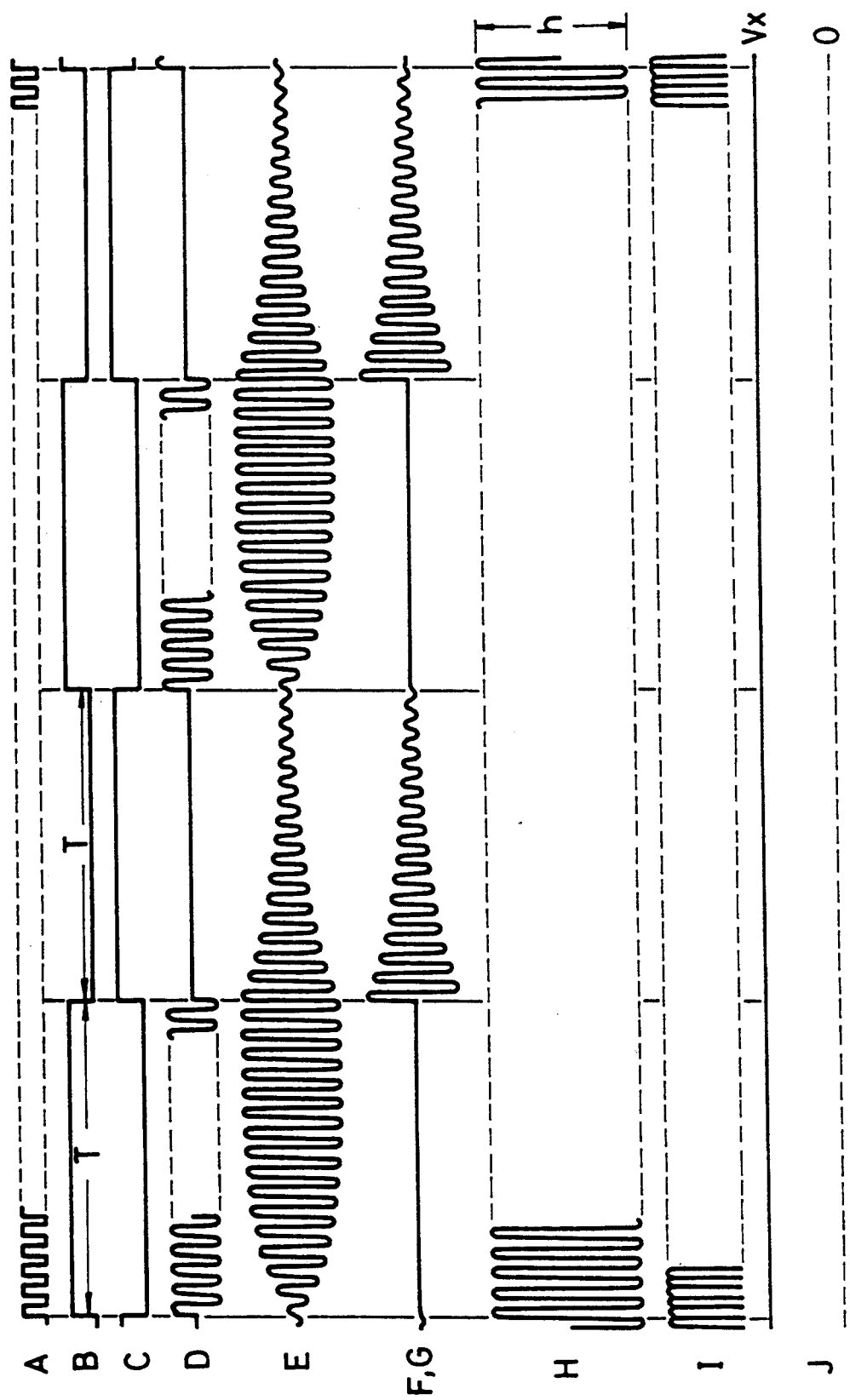
FIG. 8 is a waveform diagram of signals at respective portions of the circuit shown in FIG. 7.

The operation of the position detection control circuit 300 will be described below together with the construction of the same. The description will be first made with specific reference to FIG. 8 with respect to the manner in which electric waves are exchanged between the sensing section 10 and the pen 2 as well as to signals during exchange of the electric waves.

Figure 9:
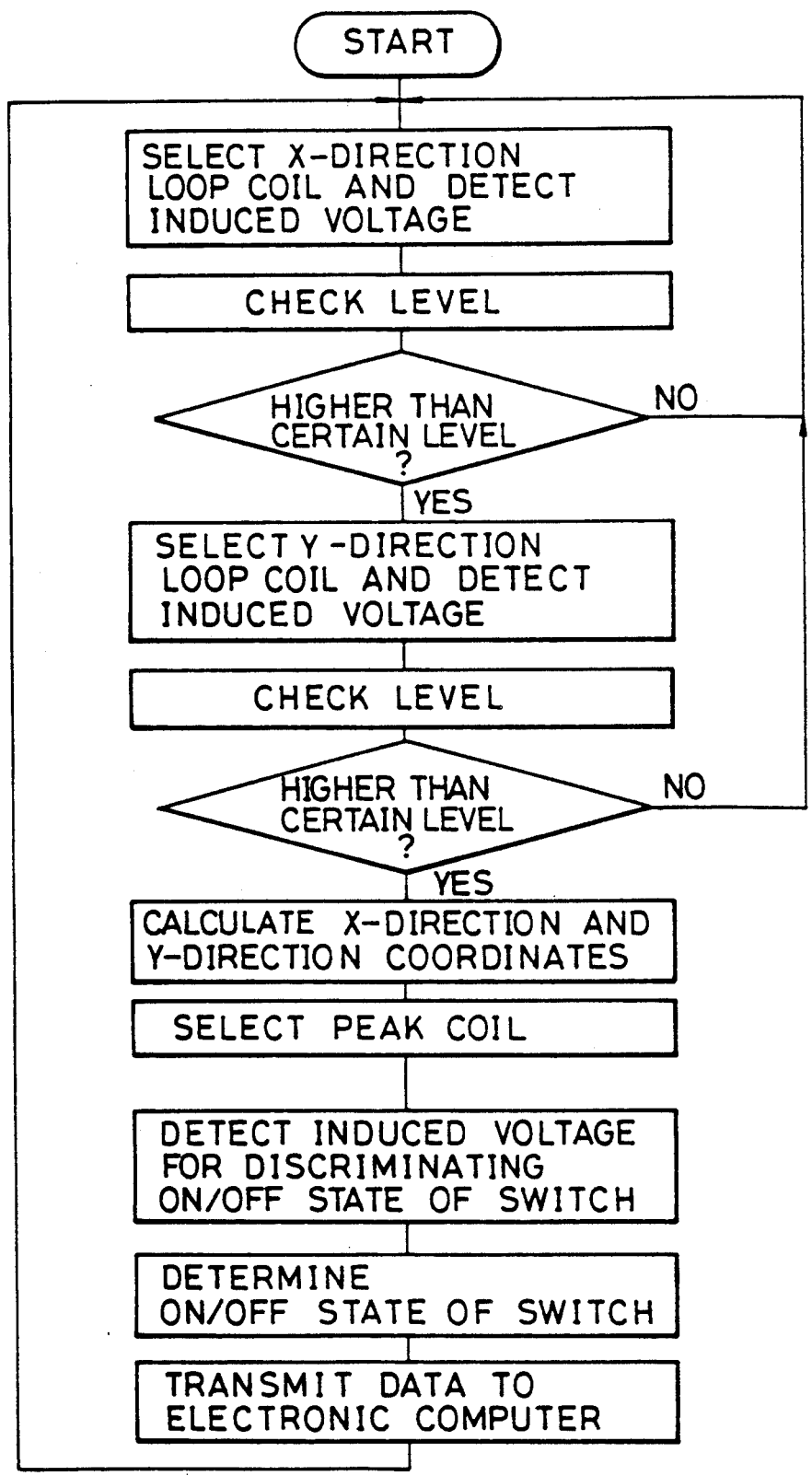
FIG. 9 is a flow chart of processing in the control circuit of a position detection control circuit.
Figure 10:
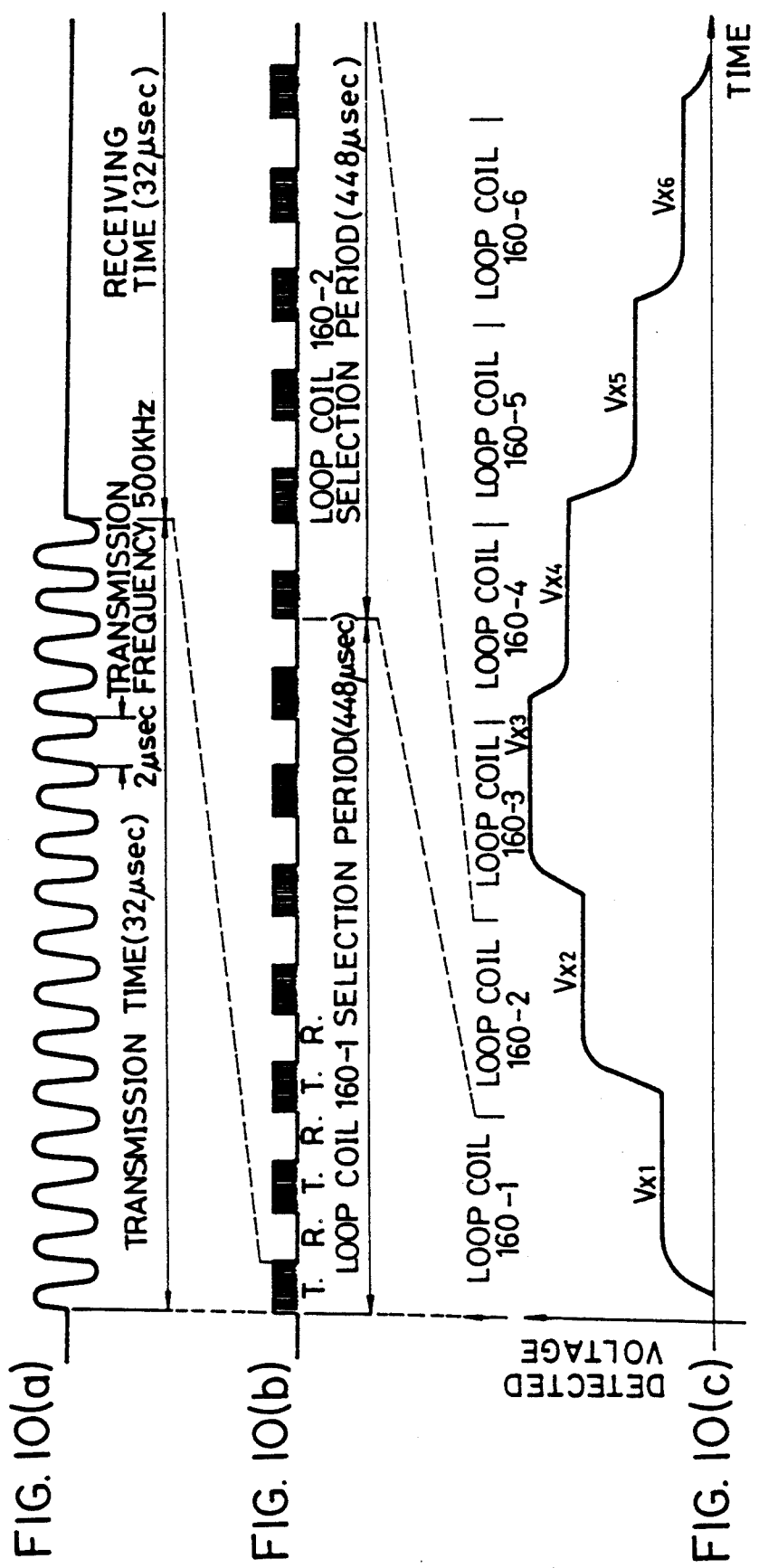
FIGS. 10(a), 10(b), and 10(c) are timing diagram of a fundamental position detecting operation of the position detection control circuit.

The control circuit 301 is constituted by a microprocessor or the like which is known per se, and is designed to control a signal generating circuit 302 and control the change-over between the loop coils of the sensing section 10 through the selection circuits 303x and 303y on the basis of the procedure shown in the flow chart of FIG. 9. The control circuit 301 also controls the X-Y change-over circuit 305 and the receiving timing change-over circuit 306 with respect to the operation of changing over the direction of detection of the coordinate position. The control circuit 301 also calculates the coordinate values of a position designated with the pen 2 by performing analog-to-digital (A/D) conversion of the outputs from the low-pass filters 309, 312, and 313 and executing an arithmetic operation which will be explained later while discriminating the state of the switch 251, and delivers resulting values to the electronic computer 900.

The selection circuit 303x selects the loop coils of the X-direction loop coil assembly 160 one after another while the selection circuit 303y selects the loop coils of the Y-direction loop coil assembly 170 one after another. These selection circuits 303x and 303y operate on the basis of information supplied from the control circuit 301.

The transmission/receiving change-over circuit 304x functions to connect each selected X-direction loop coil alternately to the drive circuit 314x and the amplifier circuit 315x. Similarly, the transmission/receiving change-over circuit 304y connects each selected X- direction loop coil alternately to the drive circuit 314y and the amplifier circuit 315y. These circuits operate in accordance with the later-mentioned transmission/receiving change-over signal.

The signal generating circuit 302 is adapted for generating a rectangular wave signal A of a predetermined frequency f0, e.g., 500 kHz, a signal A' (not shown) which is obtained by delaying the rectangular wave signal A by a predetermined angle, a transmission/receiving change-over signal B of a predetermined frequency fK, e.g., 15.625 kHz, and a receiving timing signal C of the same frequency. The rectangular wavy signal A is delivered to the phase detector 310 while being converted into a sine-wave signal by a low-pass filter (not shown) to be delivered to one of the driving circuits 314x and 314y through the X-Y change-over circuit 305. The rectangular wave signal A' is delivered to the phase detector 311, the transmission/receiving change-over signal B is delivered to the transmission/receiving change-over circuits 304x and 304y, and the receiving timing signal C is delivered to the receiving timing change-over circuit 306.

During the time when information for selecting the X-direction is being supplied from the control circuit 301 to the X-Y change-over circuit 305 and to the receiving timing change-over circuit 306, the since wave signal is delivered to the drive circuit 314x and is converted into an equilibrium signal which is then delivered to the transmission/receiving change-over circuit 304x. At this time, the transmission/receiving change-over circuit 304x selectively establishes connection to one of the drive circuit 314x and the amplifier 315x by changing over therebetween in accordance with the transmission/receiving change-over signal B. Correspondingly, the transmission/receiving change-over circuit 304x delivers to the selection circuit 303x a signal D which is obtained by intermittently issuing signals of 500 kHz every other period of time $T(=\frac{1}{2} fk)$ which is in this case 32 $\mu$sec.

The signal D is delivered through the selection circuit 303x to one of the X-direction loop coils 160-$i$ (i=1, 2, ... 48) of the sensing section 10, and the loop coil 160-$i$ produces an electric wave based on the signal D.

If the pen 2 is held substantially upright on the tablet 1, that is, maintained in a state ready for use, the electric wave based on the signal D excites the coil 252 of the pen 2 so that an induced voltage E synchronous with the signal D is generated in the tuning circuit 25.

After the loop coil 160-$i$ has been changed over to the amplifier 315x at the beginning of the period of the signal D during which the 500 kHz signal is not issued, that is, the receiving period, the electronic wave from the loop coil 160-$i$ is immediately extinguished but the induction voltage E gradually attenuates depending upon the loss in the tuning circuit 25.

A current which flows through the tuning circuit 25 by the induced voltage E generates an electric wave which conversely excites the loop coil 160-$i$ connected to the amplifier 315x. In consequence, a voltage is induced across the loop coil 160-$i$ by the electric wave issued from the coil 252. The voltage thereby induced is delivered from the transmission/receiving change-over circuit 304x to the amplifier 315x only in the receiving period and is amplified by the amplifier 315x to be output as a received signal F which is delivered to the receiving timing change-over circuit 306.

At this time, the receiving timing change-over circuit 306, which is adapted to receive one of signals respectively representing X-direction selection information and Y-direction selection information, has received X-direction selection information as well as the receiving timing signal C which is materially a signal obtained by inverting the transmission/receiving change-over signal B. The receiving timing change-over circuit 306 outputs the received signal F during the period when the signal C is high (H) level, but it outputs no signal during the period when the signal C is low (L) level. In consequence, a signal G (which is materially the same as the received signal F) is obtained at the output of the received timing change-over circuit 306.

The signal G is delivered to the band-pass filter 307 which is a ceramic filter having a resonance frequency equal to the frequency f0. The band-pass filter 307 delivers a signal H with an amplitude h in accordance with the energy of the frequency f0 component of the signal G to the director 308 and also to the phase detectors 310 and 311 (strictly speaking, on condition that several waves of the signal G have been input into the band-pass filter 307 and converged.

The signal H input into the detector 308 is detected and rectified to become a signal I which is converted by the low-pass filter 309 having a sufficiently low cut-off frequency into a D.C. signal J having a voltage value, e.g., Vx which is about half the amplitude h, and the signal J is delivered to the control circuit 301.

The voltage values Vx of the signal J is a value dependent on the distance between the input pen 2 and the loop coil 160-$i$. In this embodiment, the voltage value Vx is substantially in inverse proportion to the biquadrate of the distance and changes each time the loop coil 160-$i$ is changed. The control circuit 301 therefore calculates the X-coordinate value of the position designated with the pen 2 by converting the voltage value Vx obtained for each loop coil into a digital value and executing a later-mentioned arithmetic operation on digital values thereby obtained. The Y-coordinate value of the position designated with the pen 2 is also determined in the same manner.

The rectangular signal wave A has been supplied as a direction signal to the phase detector 310. If at this time the switch 251 is in the off state and if the phase of the signal H is generally corresponding to that of the rectangular wave signal A, the phase detector 310 output a signal obtained by adding inverted negative half of the signal H to positive half of the same (substantially the same as the signal I). This signal is converted, in the low-pass filter 312 similar to the above-mentioned one, into a D.C. signal having a voltage value which is about half the amplitude h (a signal substantially equal to the signal J), and this D.C. signal is delivered to the control circuit 301.

Also, the rectangular signal wave A' has been supplied as a detection signal to the phase detector 311. If as in the above the switch 251 is in the off state and if the phase of the signal H leads that of the rectangular wave signal A' by a predetermined angle, the phase detector 311 outputs a signal having components on the positive and negative sides. This signal is converted, in the low-pass filter 313 similar to the above-mentioned one, into a D.C. signal which is delivered to the control circuit 301. Since the signal output from the phase detector 311 has components on the positive and negative sides, the voltage value of the output from the low-pass filter 313 is considerably smaller than that of the output from the low-pass filter 312.

If the switch 251 of the pen 2 is then turned on, the phase of the current flowing through the tuning circuit 25 lags relative to the induced voltage E, and the phase of the received signal F also lags by a predetermined angle, that is, becomes substantially equal to that of the rectangular wave signal A'. Consequently, in response to the signal H output from the band-pass filter 307 at this time, the phase detector 310 outputs a signal having components on the positive and negative sides, and the output from the low-pass filter 312 has a voltage value substantially equal to that of the output from the low-pass filter 313 obtained in the above case where the switch 251 is in the off state. At the same time, the signal H is changed by the phase detector 311 into a signal inverted to the positive side, and the output from the low-pass filter 313 becomes a D.C. signal having the predetermined voltage value generally corresponding to ½ the amplitude h.

Thus, the predetermined voltage value is obtained as the output from the low-pass filter 213 when the switch 251 is in the off state, and the predetermined voltage is also obtained as the output from the low-pass filter 313 when the switch is in the on state. It is therefore possible to discriminate whether the switch 251 is on or off by observing, in the control circuit 301, the outputs from the low-pass filters 312 and 313.

The information on the on (or off) state of the switch 251 thus discriminated is used as information for selecting one of coordinate values of the position designated with the pen 2 which is to be input actually.

Next, the overall operation of the position detecting device will be described below with reference to FIGS. 9 to 12 along with the coordinate detecting operation of the position detection control circuit 300 and the state of the pen 2 or, specifically, details of the process of discriminating on/off state of the switch 251.

The power source for the whole of the position detecting device is first turned on, and the device becomes ready to operate. That is, the control circuit 301 delivers information for selection of X-direction detection to the X-Y selection circuit 305 and to the receiving timing change-over circuit 306, and delivers to the selection circuit 303x information for selecting the first loop coil 160-1 from the X-direction loop coils 160-1 to 160-48 of the sensing section 10 so as to connect the loop coil 160-1 to the transmission/receiving change-over circuit 304x.

The transmission/receiving change-over circuit 304x operates to connect the loop coil 160-1 alternately to the drive circuit 314x and the amplifier 315 in accordance with the transmission/receiving change-over signal B. At this time, the drive circuit 314x delivers 16 sine waves at a frequency of 500 kHz to the loop coil 160-1 such as those shown in FIG. 10(a) in the transmission period of 32 μsec.

The change-over between transmission and receiving is repeated seven times for each loop coil or, i.e., in this case, for the loop coil 160-1, as shown in FIG. 10(b). The time length corresponding to seven cycles of the change-over between transmission and receiving corresponds to the period (488 μsec) of selection of one loop coil.

During each of seven receiving periods, the amplifier 315x outputs an induced voltage with respect to each loop coil. As explained before, induction voltages thereby obtained are delivered through the receiving timing change-over circuit 306 to the band-pass filter 307 so as to be averaged. The averaged output from the band-pass filter 307 is delivered to the control circuit 301 via the detector 308, phase detectors 310 and low-pass filters 309, 312, and 313.

The control circuit 301 receives the output from the low-pass filter 309 after A/D conversion and temporarily stores the converted value as a detection voltage, e.g., V×1 dependent on the distance between the pen 2 and the loop coil 160-1.

Subsequently, the control circuit 301 delivers information for selecting the loop coil 160-2 to the selection circuit 303x so as to connect the loop coil 160-2 to the transmission/receiving change-over circuit 304x, thereby obtaining and storing a detection voltage V×2 dependent on the distance between the pen 2 and the loop coil 160-2. Thereafter, the control circuit 301 operates to successively connect the loop coils 160-2 to 160-48 to the transmission/receiving change-over circuit 304x in the same manner as in the case of the loop coil 160-1, thereby storing detection voltages V×1 to V×48 each dependent on the X-direction distance of the pen 2 and the corresponding loop coil, as shown in FIG. 10(c) (only part of which are illustrated in an analog manner in FIG. 10(c)).

Figure 11:
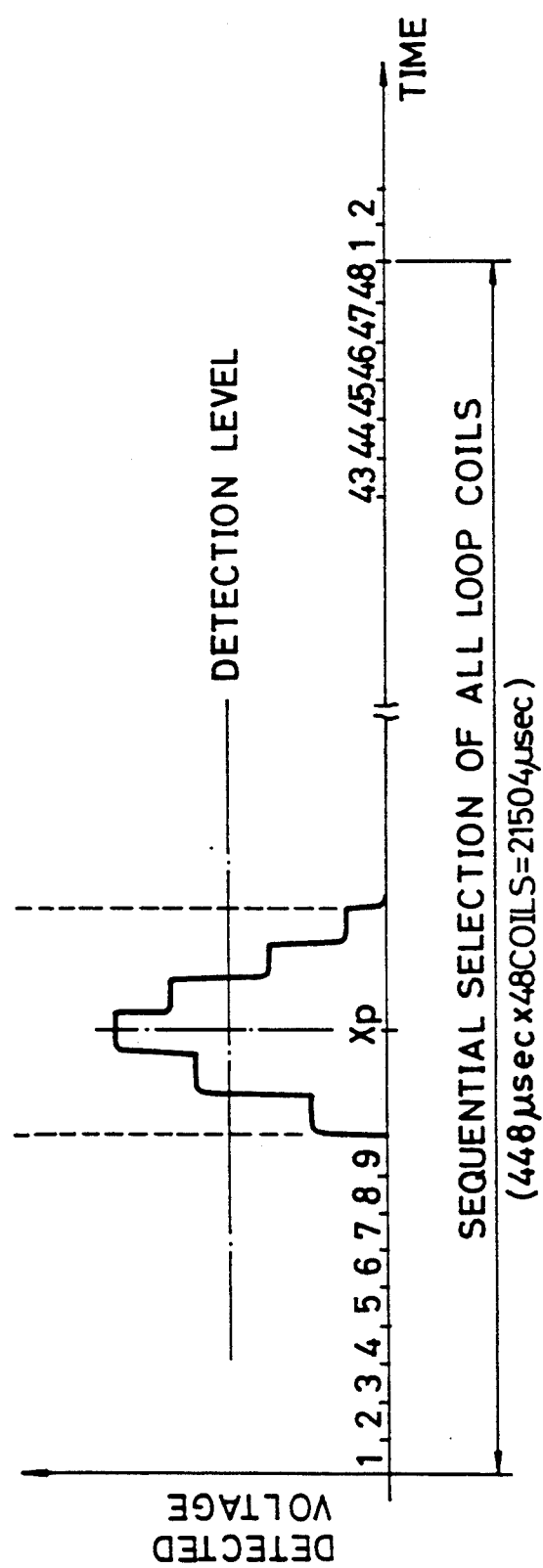
FIG. 11 is a diagram of detection voltages obtained from the loop coils during the first position detecting operation.
Figure 12:
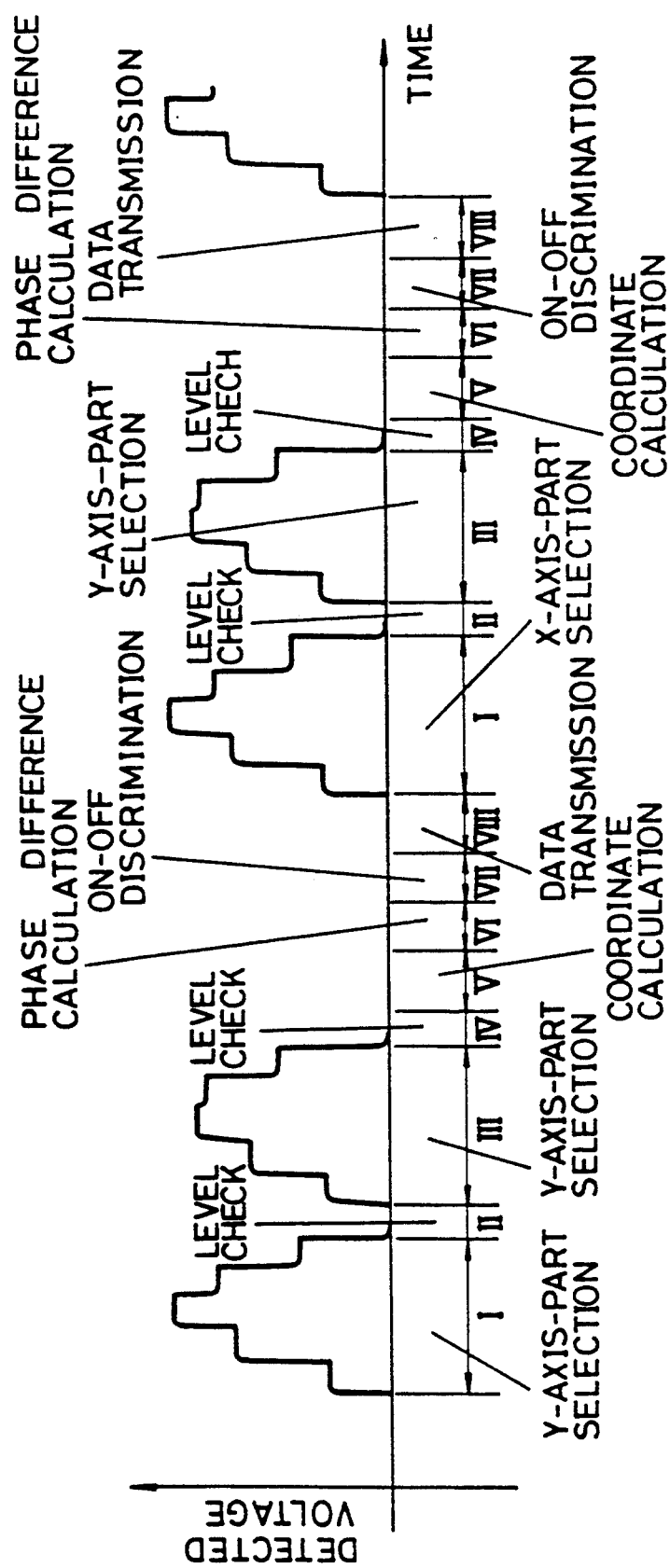
FIG. 12 is a timing diagram of second and subsequent position detecting operation and the state of discrimination operation.

Actually, however, the detection voltages appear only in several loop coils on each side of the position xp at which the tip of the pen 2 is placed, as will be seen from FIG. 11

The control circuit 301 checks whether or not the values of the detection voltages stored as described above exceed a predetermined detection threshold level. If there is no voltage value higher than the predetermined detection threshold level, the control circuit operates so as to repeat the selection of the X-direction loop coils and detection of voltages relating to the same. If one of the voltage values is higher than the threshold level, the process proceeds to the next step.

Next, the control circuit 301 operates to deliver information for selection of Y-direction detection to the X-Y change-over circuit 305 and to the receiving timing change-over circuit 306 so as to change over the selection circuit 303y and the transmission/receiving change-over circuit 304y in the same manner as the above operation of X-direction detection. The control circuit 301 temporarily stores the detection voltages dependent on the distances between the respective Y-direction loop coils and the pen 2 obtained through A/D conversion of the output from the low-pass filter 309 during exchange of electric waves. Subsequently, level checking is performed in the same manner as in the above, the process returns again to the steps of selection of X-direction loop coils and detection of voltages relating to the same if there is no detection voltage higher than the predetermined detection threshold level, or the process proceeds to the steps of calculating the Y-direction coordinate values of the position designated with the pen 2 from the stored voltage values in a later-explained manner, if one of the voltage values is higher than the threshold level.

Subsequently, the control circuit 301 delivers to the selection circuit 303x (or 303y) information for selecting one of the X-direction loop coils 160-1 to 160-48 (or the Y-direction loop coils 170-1 to 170-48) from which the highest detection voltage has been obtained, thereby conducting the above-described operation of transmitting and receiving electric waves a number of times, e.g., seven times, as explained above. At the same time, the control circuit 301 executes A/D conversion of the outputs from the low-pass filters 312 and 313 and detects, as explained above, which one of the values thereby obtained is larger than the predetermined value, thereby discriminating the on/off state of the switch 251.

The results of discrimination of the on/off state of the switch 251 are transmitted to the electronic computer 900 together with the above-mentioned X- and Y-coordinate values of the position designated with the pen 2.

The first cycle of coordinate-detection and status-discrimination operations is thus completed. Then, the control circuit 301 conducts second and subsequent operation cycles, as will be explained hereafter with reference to FIG. 12. The control circuit 301 delivers to the selection circuit 303x information for selecting a predetermined number of X-direction loop coils, e.g., 10 coils, centered at one of the X-direction loop coils 160-1 to 160-48 from which the highest detection voltage has been obtained. The control circuit 301 also delivers to the selection circuit 303y information for selecting a predetermined number of Y-direction loop coils, e.g., 10 coils centered at one of the Y-direction loop coils 170-1 to 170-48 from which the highest detection voltage has been obtained. In consequence, the operation of detecting X- and Y-direction coordinates and the operation of discriminating the on/off state of the switch 251 are conducted in the same manner as those described above, and coordinate values thereby obtained and results of discrimination are transmitted to the electronic computer 900. The control circuit thereafter repeats the described operations.

The above-mentioned level checking is a processing whereby whether the maximum value of the detection voltages is equal to or higher than the predetermined detection threshold level and which one of the loop coils has exhibited the highest detection voltage are checked, the subsequent operation including calculation of coordinates is inhibited if the maximum value is equal to or higher than the detection threshold level, and whereby the center of a group of the loop coils which are to be selected in the next cycle of coordinate-detection and status-discrimination operations is set.

The various methods of calculating the X- and Y-direction coordinate values of a point, e.g., coordinate values xp. In one possible method, a portion of the waveform in the vicinity of the maximum of the detection voltages $V \times 1$ to $V x - 48$ is approximated by a suitable function, and the coordinate of the maximum value of the function is obtained.

For instance, the detection voltage $V \times 3$ corresponding to the maximum value and the voltages $V \times 2$ and $V \times 4$ on both sides of the maximum voltage $V \times 3$ shown in FIG. 10(c) are approximated by a quadratic function, and the coordinates are obtained the following calculation (where the coordinate values of the centers of the loop coils 160-1 to 160-48 are represented by x1 to x48 and the distance is represented by $\Delta x$).

The following equations are obtained from the voltages and the coordinate values:

$$V \times 2 = a(x2 - xp)^2 + b \quad (1)$$

$$V \times 3 = a(x3 - xp)^2 + b \quad (2)$$

$$V \times 4 = a(x4 - xp)^2 + b \quad (3)$$

where a and b are constants (a<0), and $$x3 - x2 = \Delta x \quad (4)$$

$$x4 - x2 = 2\Delta x \quad (5)$$

The equations 5 and 6 are substituted in equations 3 and 4, thereby forming $$xp = x2 + \Delta x/2\{(3V \times 2 - 4V \times 3 + V \times 4)/(V \times 2 - 2V \times 3 + V \times 4)\} \quad (6)$$

It is therefore possible to determine the coordinate value xp of the position designated with the pen 2, by extracting, from the group of detection voltages $V \times 1$ to $V \times 48$, the maximum detection voltage and the voltages detected from the loop coils on both sides of the coil from which the maximum voltage has been detected, and executing the calculation of the equation 6 with these voltage values and with the coordinate value (known) of the loop coil adjacent to and in front of the loop coil from which the maximum voltage has been detected.

The coordinate values thus detected are displayed on the liquid crystal display panel 50 under the control of the display control circuit 500 each time they are detected.

Figure 13:
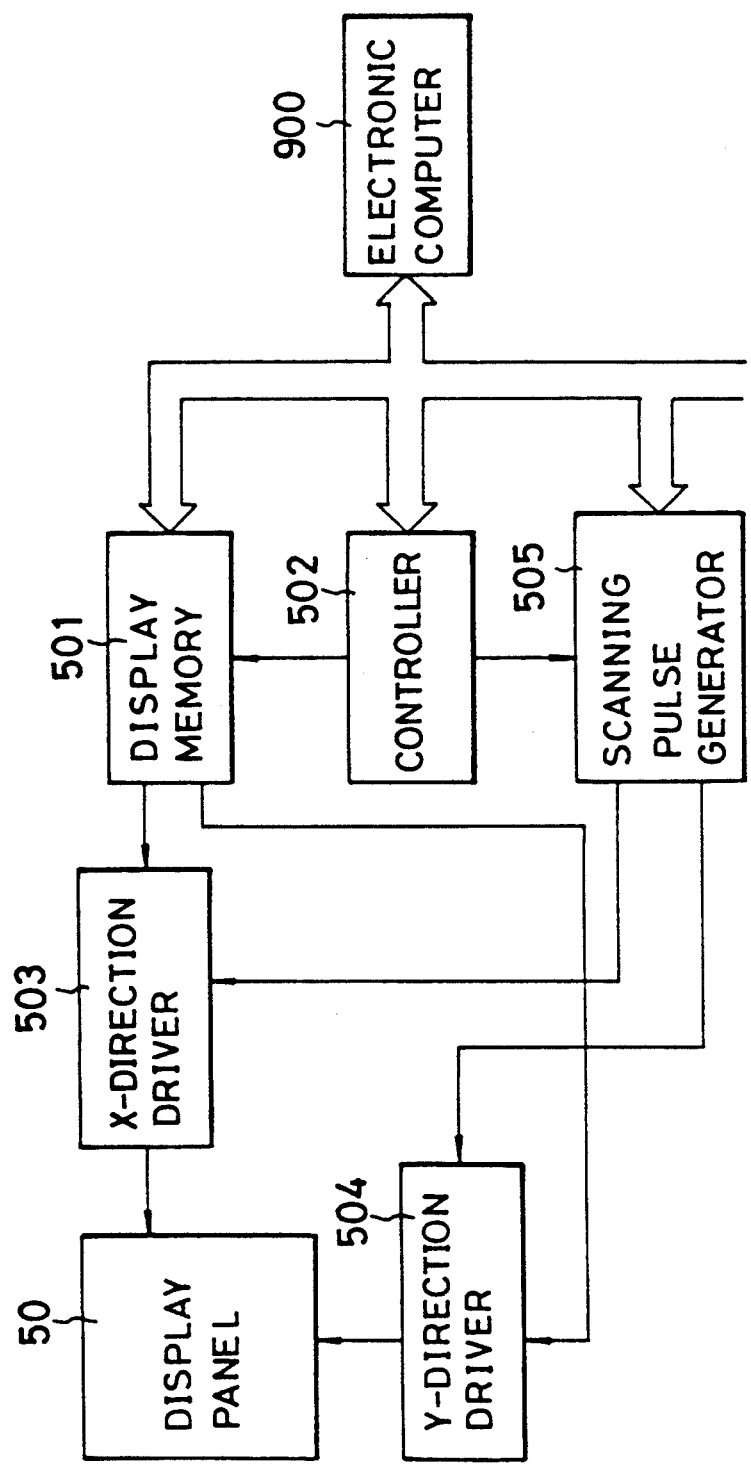
FIG. 13 is a diagram of a display control circuit.

Referring to FIG. 13, details of the display control circuit 500 are shown in which position data items constituted by X-direction data and Y-direction data on positions successively designated in the sensing section 10 are input into the electronic computer 900 and are thereafter stored while being arranged in a certain order. The position data items are successively read out with timing pulses supplied from a controller 502 which serves as a display processor, and are output to an X-direction driver 503 and a Y-direction driver 504.

As the X-direction driver 503 and the Y-direction driver 504 are supplied with scanning pulses generated by a scanning pulse generator 505 in synchronism with timing pulses from the controller 502, they supply the X- and Y-direction position data items to the liquid crystal display panel 50, and the position designated with the pen 2 on the sensing section 10 is displayed on the liquid crystal display panel 50 at the corresponding position. Consequently, a line which is substantially the same as the line along which a character or figure is written with the pen 2 on the liquid crystal display panel 50 superposed on the sensing section 10 is displayed on the liquid crystal display panel 50 with a high illumination of light from the cold cathode lamp 60 and the light guide plate 70 disposed under the sensing section 10.

In accordance with the present invention, as described above, the sensing section 10 is formed of the transparent base 11 through which light can be transmitted, and the back light 60 for enabling display on the display panel 50 with improved contrast and high illumination is disposed under the sensing section 10, thereby making it possible to set the distance between the sensing section 10 and surface of the display panel markedly smaller than that in the case of the conventional device. The present invention thus realizes a position detecting device in which the possibility of occurrence of input errors is very small even if a coordinate inputting is effected from a position distanced from the surface of the display panel 50 and which thus enables coordinate positions to be input with high accuracy. The use of the cold cathode lamp for the back light 60 makes the display light easy to see.

In the above-described embodiment, the number of loop coils and the arrangement of the loop coils are only illustrative and are not limitative. It is of course possible to use a cursor in place of the stylus pen.

Figure 14:
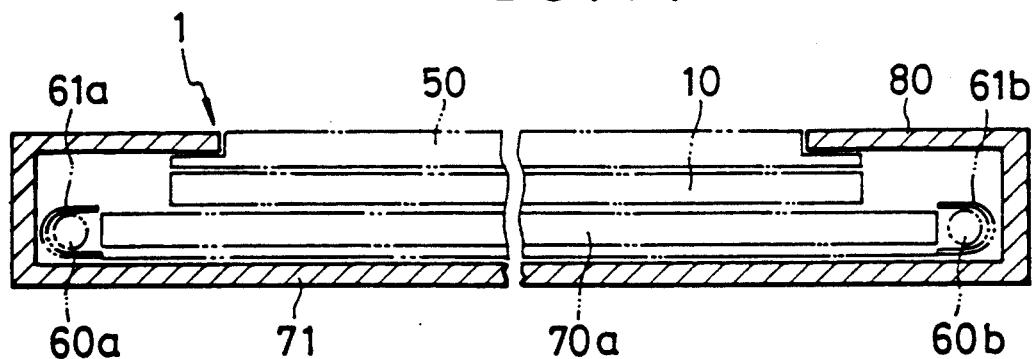
FIG. 14 is a cross-sectional view of another example of the tablet.

FIG. 14 shows in section another example of the tablet 1. This example differs from the example illustrated above and in FIG. 2 in that a pair of back lights 60a and 60b formed of cold cathode lamps and disposed on opposite sides of a light guide plate 70a together with generally U-shaped reflecting plates 61a and 61b having their inner surfaces coated with aluminum by evaporation, and that, for the function of the light guide plate 70, a printed pattern capable of reflecting light is superposed on a reflecting plate 71, a layer is formed from acrylic resin over the printed pattern, and a diffuser plate is superposed on the acrylic resin layer. The arrangement shown in FIG. 14 enables a reduction in the overall thickness of the tablet 1 and ensures that the whole of the display panel 50 is illuminated more uniformly by the effect of the diffuser plate and other members.

Figure 15:
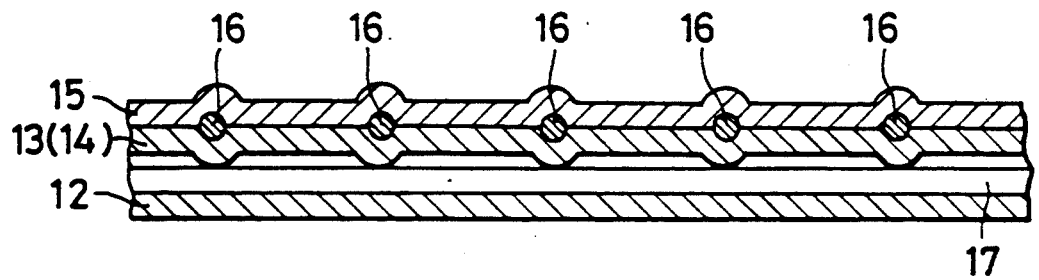
FIG. 15 is fragmentary enlarged cross-section of another example of the transparent base of the tablet.

FIG. 15 is an enlarged cross-sectional view illustrating essential portions of another preferable example of the transparent base 11 of the sensing section 10. This example differs from the transparent base 11 shown in FIG. 3 in that multiplicity of copper wires 16 are arranged parallel so as to extend in the Y-direction and a multiplicity of copper wires 17 are arranged parallel so as to extend in the X-direction, a transparent film corresponding to the transparent film 13 (or 14) shown in FIG. 3 being interposed between the groups of copper wires 16 and 17, and the copper wires 16 and 17 being sandwiched between laminations formed of the transparent films 15 and 12. This arrangement eliminates the need for the transparent film 14 (or 13) shown in FIG. 3, thereby reducing the number of component parts, the overall thickness of the tablet 1 and the manufacturing cost. In addition, the light transmission factor of the transparent base 11 is thereby increased, enabling a high illumination over the display surface.

In the above-described embodiment, the position detecting device makes use of the sensing section having the transparent base laminated with transparent films with copper wires interposed therebetween. The present invention, however, is not limited to this. Instead, a sensing section in which the electrodes are formed from, for example, a non-metallic material such as indium oxide having light-transmission properties may be used. Also, it is of course possible to use a sensing section in which colored electrodes are formed by a suitable means such as printing on a transparent film made of polyester or the like.

Figure 16:
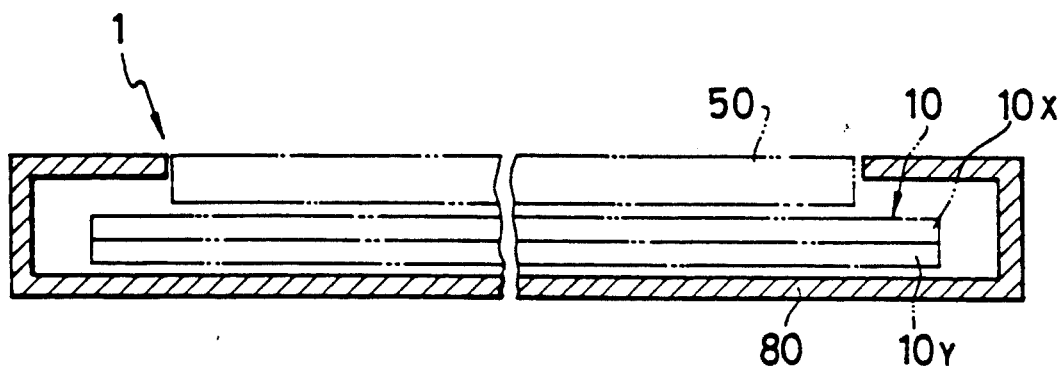
FIG. 16 is a cross-sectional view of still another example of the tablet.
Figure 17:
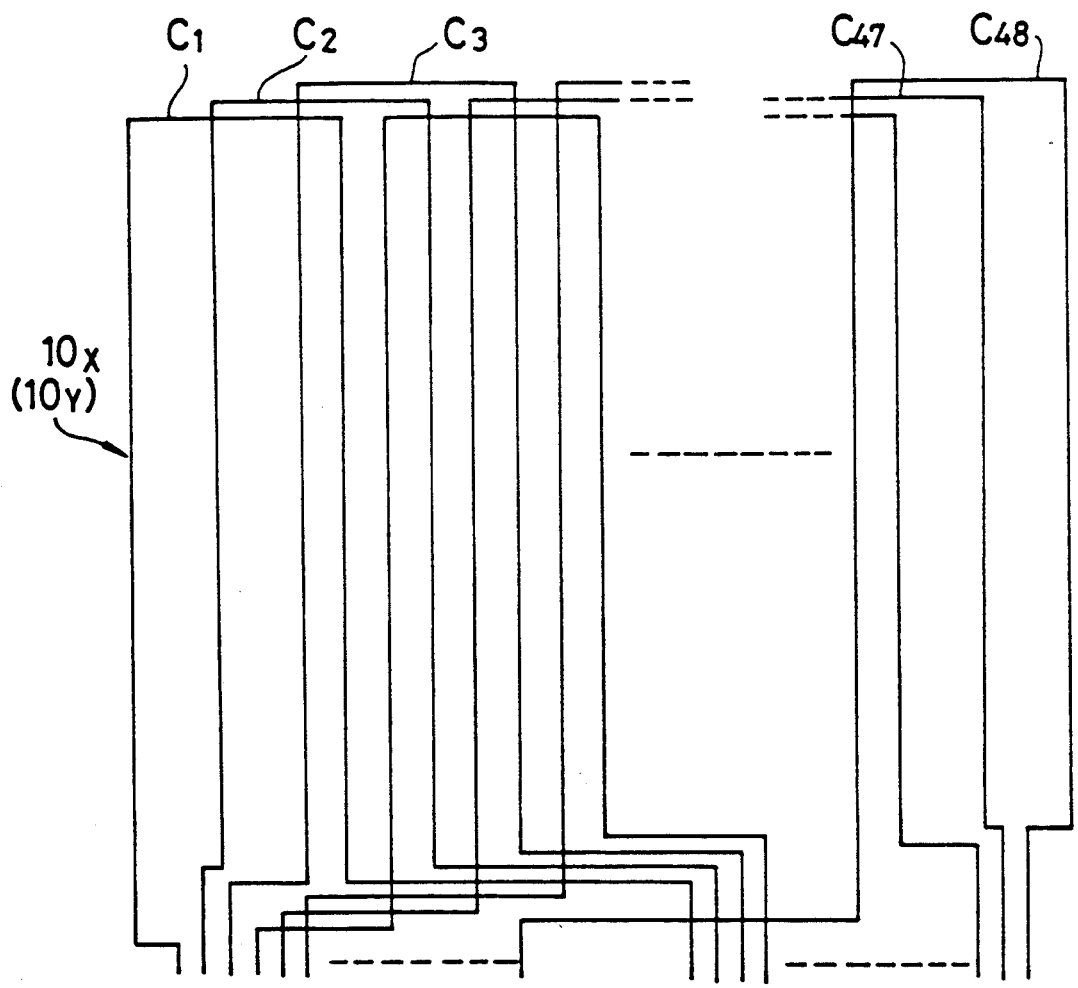
FIG. 17 is a diagram of the arrangement of loop coils.

FIG. 16 shows another example of the tablet 1 in which a reflection type of liquid crystal display panel 50 provided for display of coordinates is placed on a sensing section 10 composed of X-direction and Y-direction position detectors $10_X$ and $10_Y$, and these components are integrally accommodated in a case 80 formed from a metallic material. As shown in FIG. 17, each of the position detectors $10_X$ and $10_Y$ is provided with a plurality of or, for example, 48 loop coils C1, C2, ... C48 which are formed of parallel conductors and which are arranged parallel in the direction of the arrow such that they overlap each other.

These loop coils may be formed by connecting, with jumper wires, a multiplicity of parallel conductors which are formed on a flat base by, for example, etching, that is, in the manner of forming a well known type of printed circuit board. The reflection type of liquid crystal display panel 50 has a reflecting plate (not shown) which may be formed from a material capable of transmitting electronic waves and magnetism to the sensing section 10, e.g., white polyethylene terephthalate resin of the like. In this example, it is not necessary to make the sensing section 10 transparent.

Figure 18:
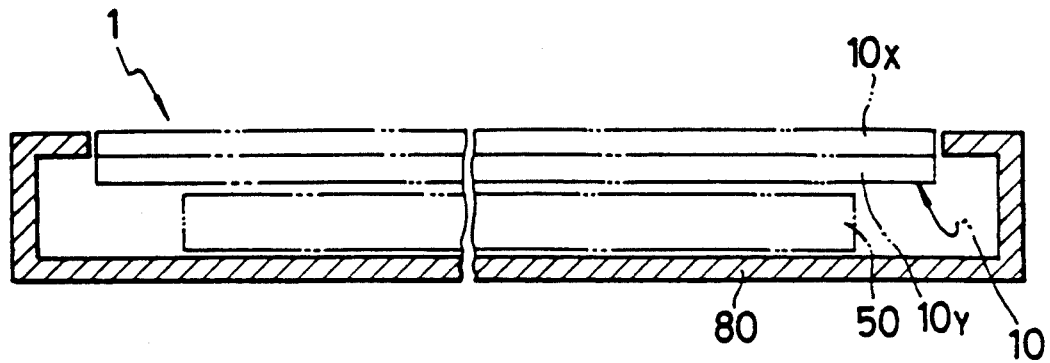
FIG. 18 is a cross-sectional view of a further example of the tablet.
Figure 19:
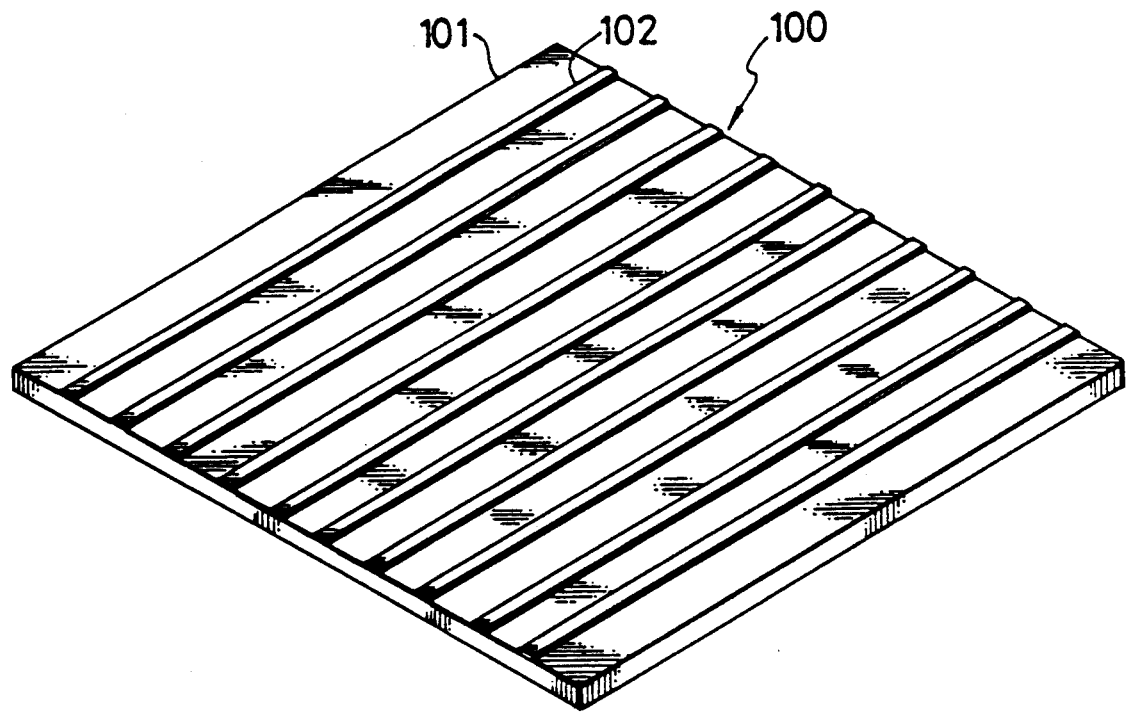
FIG. 19 is a diagram of the construction of a position detector.

FIGS. 18 and 19 show a still another example of the tablet 1. In this example, as shown in FIG. 18, a sensing section 10 composed of X-direction and Y-direction position detectors $10_X$ and $10_Y$ is placed on a flat type of display panel 50 provided for display of coordinates, e.g., a liquid crystal display panel, and these components are integrally accommodated in a case 80 formed from a metallic material. The sensing section 10 having light-transmission properties as mentioned below is used in common for a cover plate for the liquid crystal display panel 50.

FIG. 19 shows the X-direction position detector $10_X$ of the sensing section 10 having loop coils C1 to C48, such as those shown in FIG. 17, which are formed by connecting conductors on a conductor plate 100 by jumper wires or the like.

The conductor plate 100 is constructed in such a manner that a plurality of transparent conductors 102 in the form of strips (ten conductors in the illustrated example) each having a width of 0.5 to 1 mm and formed from indium oxide (InO3), tin oxide (snO3) or the like is deposited on the surface of a transparent base 101 having flexibility and insulating properties made of polycarbonate or the like. The position detector $10_Y$ has the same structure. The position detectors $10_X$ and $10_Y$ are bonded together with a bonding sheet while being superposed one on the other in such a manner that the group of conductors 102 of each detector is located below the base 101 and that the groups of conductors 102 intersect each other at right angles as seen from above.

Figure 20:
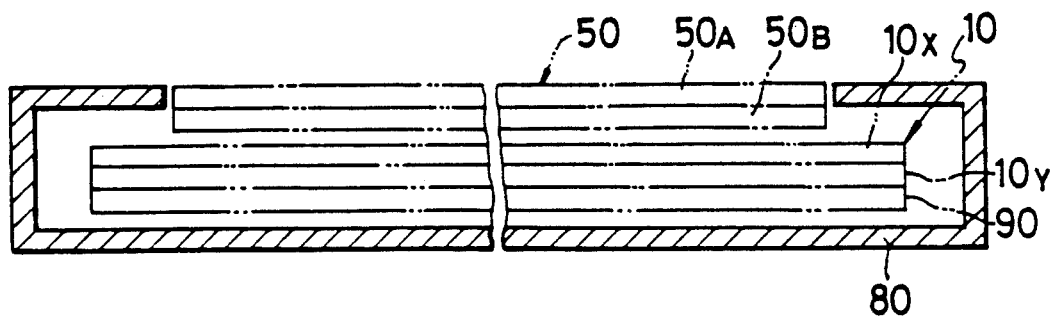
FIG. 20 is a cross-sectional view of a further example of the tablet.

FIG. 20 shows a further example of the tablet 1 in which a flat type of display panel 50 provided for display of coordinates, e.g., a liquid crystal display panel is placed on a sensing section 10 composed of X-direction and Y-direction position detectors $10_X$ and $10_Y$, a shielding plate 90 is superposed on the lower surface of the sensing section 10, and these components are integrally accommodated in a case 80 formed from a non-metallic material.

The display panel 50 is formed as a transparent type of liquid crystal having a liquid crystal display body 50A and a back light 50B for illuminating the liquid crystal display body 50A from below. The back light 50B is adapted for displaying with improved contrast and high illumination. The back light 50B is constituted by, for example, EL elements, and electrodes (not shown) of the back light 50B are formed from a non-metallic transparent material such as indium oxide in order to avoid attenuation of electric waves propagating through the back light during transmission/receiving between the sensing section and the pen. The back light 50B is provided with a reflecting plate or layer (not shown) for reflecting light emitted from the back light 50B toward the liquid crystal display body 50A. The reflecting plate or layer is also designed to limit attenuation of electric waves and may be formed by depositing, for example, aluminum provided as reflective material over a resin film to a thickness of about 300 to 600 Å, dispersing aluminum power in a resinous material, or applying a reflective pigment. A material capable of transmitting electronic waves and magnetism to the sensing section 10, e.g., white polyethylene terephthalate resin or the like can also be used to form the reflecting plate.

Figure 21:
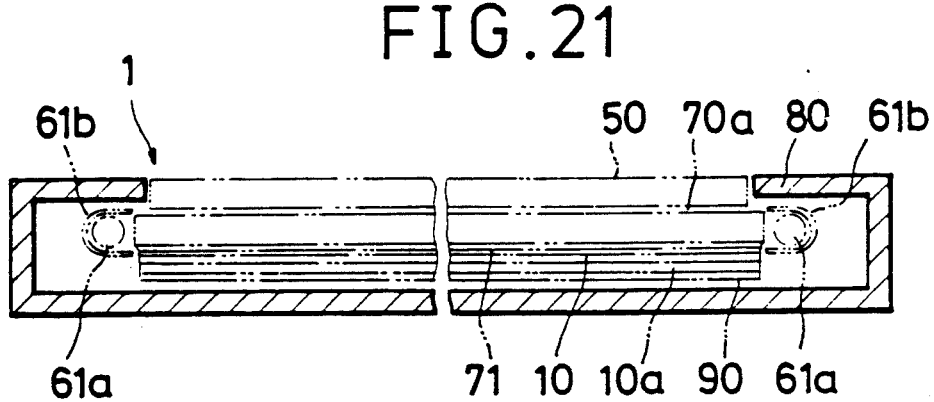
FIG. 21 is a cross-sectional view of a further example of the tablet.
Figure 22:
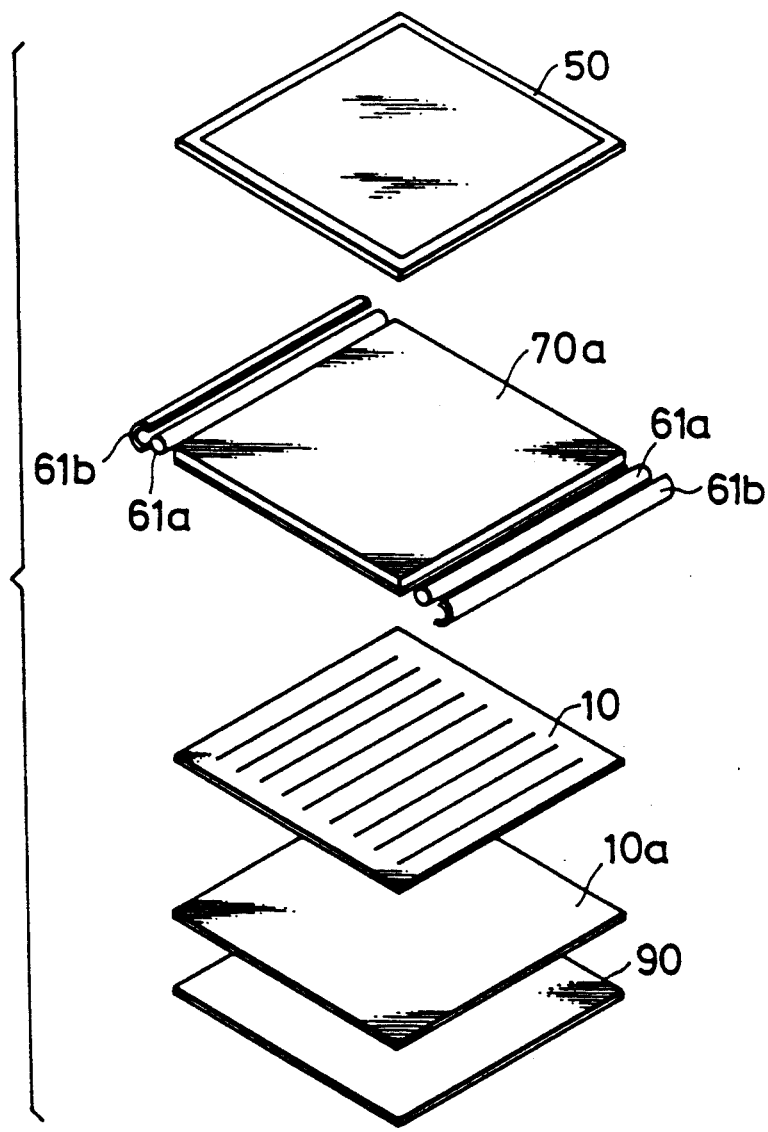
FIG. 22 is an exploded perspective view of essential portions shown in FIG. 21.

FIGS. 21 and 22 shows a further example of the tablet 1. This example differs from the tablet shown in FIG. 14 in that positions of the sensing section 10 and the light guide plate 70a are reversed; the sensing section 10 is not necessarily transparent; silver is deposited over the reflecting surfaces of reflecting plates 61b and 71; a back plate 10a made of a synthetic resin or the like is provided on the lower surface of the sensing section 10 in order to improve the strength thereof; and a shielding plate 90 formed of a silicon steel plate is provided as a lowermost layer to improve the magnetic shielding effect. Except for these points, this example is the same as that shown in FIG. 14.

The above-described embodiments of the present invention are only illustrative, and various changes and modifications including changes in the positional relationship between the component parts and changes in the combination of the component parts can be made without departing from the scope and the spirit of the present invention. For example, a plasma display unit may used for the display.

What is claimed is:

1. A position detecting device having:
   a position pointer having a tuning circuit; and
   a tablet for position detection having electric wave generating means for generating an electric wave at a frequency equal to the resonance frequency of said tuning circuit, and electric wave detecting means for detecting an electric wave reflected by said tuning circuit,
   coordinate values of a position designated with said position pointer on said tablet being detected by exchange of electric waves between said position pointer and said tablet,
   said position detecting device comprising:
   coordinate display means for displaying said designated position with coordinates corresponding to said coordinate values; and
   a back light for illuminating said display means from below.

2. A position detecting device according to claim 1, wherein said back light is constituted by an electroluminescent element.

3. A position detecting device according to claim 1, wherein said back light is a cold cathode lamp.

4. A position detecting device comprising:
   a section for detecting a position in X- and Y-directions having on its transparent base a group of a plurality of transparent loop coils arranged in X-direction and a group of a plurality of transparent loop coils arranged in Y-direction;
   An X/Y-direction selection circuit for selecting said X-direction loop coils one after another and also selecting said Y-direction loop coils one after another;
   a transmission circuit generating an alternating signal of a predetermined frequency to be supplied to said X-direction and Y-direction loop coils.
   a receiving circuit for detecting an induced voltage of a frequency substantially equal to that of said alternating signal from induced voltages generating across said X-direction and Y-direction loop coils;
   an X/Y direction connection change-over circuit for connecting one of each of said group of X-direction and Y-direction loop coils alternately to said transmission circuit and said receiving circuit;
   a position pointer having a tuning circuit including a coil and a capacitor, said tuning circuit being capable of tuning with an electric wave generating from said X-direction and Y-direction loop coils to which said alternating signal is supplied;
   a processor for obtaining a position designated with said position pointer in X- and Y-directions from induced voltages generating across said X-direction and Y-direction loop coils; and
   coordinate display means making use of said base in common as a cover plate, said coordinate display means displaying X-direction and Y-direction data on said designated position as coordinates corresponding to the coordinates of said designated position.

5. A position detecting device according to claim 4, wherein said tuning circuit of said position pointer is capable of varying phases of voltages and current by the operation of a switch means, and the state of said switch means in said position pointer is detected from the phase of an induced voltage detected in said receiving circuit.

6. A position detecting device having:
   a sensing section having light-transmission properties;
   a position pointer for designating a position; and
   a position detection control circuit for obtaining coordinate values of a position designated with said position pointer,
   said position detection device comprising display means for displaying positional data obtained in said position detection control circuit as coordinates corresponding to the coordinates of said designated position, said display means being superposed over said sensing section, said display means having a back light disposed below said display means to illuminate the same from below, thus constituting a tablet.

7. A position detecting device having:
   a sensing section having an X-direction loop coil assembly formed of a multiplicity of loop coils arranged in X-direction, a Y-direction loop coil assembly formed of a multiplicity of loop coils arranged in Y-direction, and a transparent base for retaining said loop coil assemblies in predetermined positions;
   a position pointer having a tuning circuit having a predetermined tuning frequency, said tuning circuit including at least a coil and a capacitor;
   and a position detection control circuit having X-direction selection means for selecting said loop coils in said X-direction loop coil assembly one after another, Y-direction selection means for selecting said loop coils in said Y-direction loop coil assembly one after another, signal generating means for generating an alternating signal of said predetermined frequency, signal detecting means for detecting said alternating signal of said predetermined frequency, connection change-over means for alternately connecting said signal generating means and said signal detecting means successively to said X-direction and Y-direction loop coils selected by said selection means, and coordinate detecting means for obtaining X-direction and Y-direction coordinate values of a position designated with said position pointer on the basis of alternating signals detected from said X-direction and Y-direction loop coils detected by said signal detecting means, said position detecting device comprising display means for displaying positional data obtained in said position detection control circuit as coordinates corresponding to the coordinates of said designated position, said display means being superposed over said sensing section, said display means having a back light disposed below said display means to illuminate the same from below, thus constituting a tablet.

8. A position detecting device having a sensing section composed of an X-direction loop coil assembly formed of a multiplicity of loop coils arranged in X-direction and a Y-direction loop coil assembly formed of a multiplicity of loop coils arranged in Y-direction, a position pointer having a tuning circuit including at least a coil and a capacitor, and a position detection control circuit which selects said X-direction loop coils and said Y-direction loop coils one after another, intermittently supplies an alternating signal to the coil thereby selected, and obtains X-direction and Y-direction coordinate values of a designated position on the basis of relative receiving levels of said loop coils determined after each of said loop coils has received, during the suspension period of said intermittent supply, an alternating signal transmitted from said position pointer by tuning to said alternating signal intermittently supplied, said position detecting device comprising display unit constituted by coordinate display means for displaying X-direction and Y-direction data on said designated position as coordinates corresponding to the coordinates of said designated position, and a back light disposed below said display means to illuminate the same from below, said display unit being superposed over said sensing section to form a tablet together with said sensing section.

9. Apparatus for determining and displaying the position of an implement on a surface, the implement including a tuned circuit with a predetermined resonant frequency, the apparatus comprising a housing including the surface,
a tablet in the housing including coils arranged in two coordinate directions parallel to the surface,
means for exciting the coils with AC energy having approximately the same frequency as the resonant frequency, the tuned circuit interacting with the AC energy to change the AC current flowing in the coils as a function of the implement position on the tablet,
an electronic two-coordinate direction display in the housing configured as a plate superposed with and lying in a plane parallel to the tablet and the surface responsive to the change in AC current resulting from the interaction between the AC energy and the tuned circuit for indicating the position of the implement on the surface.

10. The apparatus of claim 9 further including means for detecting the amplitude of the current flowing in the coils as a result of the interaction between the AC energy and the tuned circuit, the detected amplitude controlling the indication position of the implement.

11. The apparatus of claim 10 further including means for detecting the phase of the current flowing in the coils.

12. The apparatus of claim 9 wherein the surface is an exterior surface of the housing, the display including the surface.

13. The apparatus of claim 12 further including a planar light emitting surface in the housing superposed with the surface, display and tablet.

14. The apparatus of claim 13 wherein the light emitting surface comprises a light reflecting surface.

15. The apparatus of claim 14 wherein the electronic display is substantially transparent to and is positioned to be responsive to ambient light, the light emitting surface consisting of the light reflecting surface, the light-reflecting surface being positioned to reflect the ambient light transmitted through the display back to and through the display.

16. The apparatus of claim 15 wherein the light reflecting surface is positioned between the tablet and display.

17. The apparatus of claim 14 wherein the light emitting surface comprises an active light emitting source in the housing, the light emitting surface of said source positioned between and superposed with the light reflecting surface and the display.

18. The apparatus of claim 17 wherein the active light emitting source comprises an active light emitting panel.

19. The apparatus of claim 18 wherein the panel is an electroluminescent panel.

20. The apparatus of claim 17 wherein the active light emitting source comprises a light guide having lamp means disposed on an edge thereof.

21. The apparatus of claim 20 wherein the lamp means comprises a cold cathode lamp.

22. The apparatus of claim 17 wherein the tablet is substantially transparent and is positioned between the light emitting surface and the display.

23. The apparatus of claim 22 wherein the tablet includes two arrays of wires, each wire array extending in a different coordinate direction, said wires being encased by transparent dielectric films so the wires extending in a first of the coordinate directions are insulated from the wires extending in the other of the coordinate directions.

24. The apparatus of claim 23 wherein the wires extending in said first coordinate direction are surrounded by first and second of said films, the wires extending in said second coordinate direction abutting the second film.

25. The apparatus of 17 wherein the light emitting surface of the active source is positioned between and superposed with the display and tablet.

26. The apparatus of claim 25 wherein the active light emitting source comprises an active light emitting panel.

27. The apparatus of claim 12 wherein the light emitting surface is positioned between and superposed with the display and tablet.

28. The apparatus of claim 12 wherein the tablet is substantially transparent and is positioned between the light emitting surface and the display.

29. The apparatus of claim 28 wherein the light emitting surface comprises an active light emitting planar source positioned between and superposed with the light reflecting surface and the display.

30. The apparatus of claim 29 wherein the active light emitting planar source comprises a light guide having lamp means disposed on an edge thereof.

31. The apparatus of claim 29 wherein the active light emitting source comprises an active light emitting panel.

32. The apparatus of claim 31 wherein the panel comprises a cold cathode light emitting panel lamp.

33. The apparatus of claim 9 wherein the tablet is substantially transparent and is positioned so optical energy is transmitted through it to the display.

34. The apparatus of claim 33 further including a planar light emitting surface in the housing superposed with the surface, display and tablet.

35. The apparatus of claim 34 wherein the light emitting surface comprises a light reflecting surface.

36. The apparatus of claim 33 wherein the light emitting surface comprises an active light emitting source having a planar light emitting surface superposed with the display.

37. The apparatus of claim 36 wherein the planar light emitting surface of the active source is positioned behind the tablet.

38. The apparatus of claim 37 wherein the light emitting surface includes a reflector positioned behind the light emitting planar source of the active source.

39. The apparatus of claim 37 wherein the active light emitting source comprises an active light emitting panel.

40. The apparatus of claim 39 further including a light guide plate superposed between the panel and the tablet.

41. The apparatus of 39 wherein the active light emitting source comprises a light guide having lamp means disposed on an edge thereof.

42. The apparatus of claim 33 wherein a face of the tablet forms the surface, the display being positioned behind the tablet to be responsive to ambient light transmitted through the tablet.

43. The apparatus of claim 33 wherein the tablet includes two arrays of wires, each wire array extending in a different coordinate direction, said wires being encased by transparent dielectric films so the wires in the first coordinate direction are insulated from the wires of the second coordinate direction.

44. The apparatus of claim 43 wherein the panel is an electroluminescent panel.

45. The apparatus of claim 33 wherein the tablet includes first and second transparent dielectric substrates, the first substrate including a first array of transparent conductors extending in a first coordinate direction, the second substrate including a second array of transparent conductors extending in a second coordinate direction.

46. The apparatus of claim 9 wherein the housing includes a metal shield plate that is parallel to and superposed with the display surface, light emitting surface and tablet.

47. The apparatus of claim 46 wherein the shield plate includes a wall of the housing.

48. The apparatus of 46 wherein the shield plate includes a plate between the tablet and an exterior wall of the housing behind the surface.

49. The apparatus of claim 9 wherein the coils are excited during a first interval while the AC energy is at the predetermined frequency, and the means for exciting responds to energy coupled back to the coils from the tuned circuit during a second interval while the coils are not excited by the AC energy at the predetermined frequency.

50. The apparatus of 49 further including means for detecting the phase of the current flowing in the coils during the second interval.

51. The apparatus of claim 50 wherein the phase detecting means includes first and second phase detectors responsive to the AC source and a replica of the energy coupled back to the coils during the second interval, the phase detectors being arranged so that the relative phases of waves supplied to the phase detectors are displaced 90°.

52. In combination,
a housing,
a tablet in the housing
an AC energy source,
an implement for tracing a line on a surface of the tablet, the implement including a tuned circuit with a predetermined resonant frequency, the tablet including coils arranged in two coordinate directions in planes parallel to and superposed with the surface,
means for connecting the coils to the AC energy source, the AC energy source deriving approximately the same frequency as the resonant frequency, the tuned circuit interacting with the AC energy supplied to the coils to change the AC current flowing in the coils as a function of the implement position on the tablet,
an electronic two-coordinate direction display in the housing configured as a plate superposed with and lying in a plane parallel to the tablet and the surface, and
means responsive to the AC current flowing in the coils for activating the display so the implement position is displayed on the surface.

53. The combination of claim 52 wherein the means for indicating implement position includes means for detecting the amplitude of the current flowing in the coils.

54. The combination of claim 53 further including means for detecting the phase of the current flowing in the coils.

55. The combination of claim 52 wherein the coils are excited during a first interval while the AC energy is at the predetermined frequency, and the means for activating responds to energy coupled back to the coils from the tuned circuit during a second interval while the coils are not excited by the AC energy at the predetermined frequency.

56. Apparatus for detecting and displaying the position of an implement on a display surface, the implement including a structure interacting with a position detecting AC field derived from the apparatus, comprising a housing, an electronic two-coordinate direction display configured as a plate in the housing, the display including the display surface as an exterior face of the housing, an active light source having a light emitting surface positioned in the housing for illuminating the display surface, an optically transparent tablet positioned in the housing between the light emitting surface and the display for detecting the position of the implement on the display surface, a position detecting panel including means for establishing and detecting AC fields in the two coordinate directions, the AC fields interacting with the structure of the implement to cause conductors in the position sensor to derive signals indicative of the position of the implement on the display surface, means responsive to the derived signals for activating the display so the position of the implement on the display surface is displayed on the display surface, the display surface, light emitting surface and position detecting panel being superposed and lying in different parallel planes.

57. The apparatus of claim 56 wherein the tablet includes two arrays of wires, each wire array extending in a different one of said coordinate directions, said wires being encased by transparent dielectric films so the wires extending in a first of the coordinate directions are insulated from the wires extending in a second coordinate direction.

58. The apparatus of claim 57 wherein the panel is an electroluminescent panel.

59. The apparatus of claim 56 wherein the tablet includes first and second transparent dielectric substrates, the first substrate including a first array of transparent conductors extending in a first of the coordinate directions, the second substrate including a second array of transparent conductors extending in a second of the coordinate directions.

60. The apparatus of claim 56 wherein the housing includes a metal shield plate lying in a plane that is parallel to the planes of the display surface, light emitting surface and tablet.

61. The apparatus of claim 60 wherein the shield plate includes a wall of the housing.

62. The apparatus of claim 60 wherein the shield plate includes a plate between the tablet and an exterior wall of the housing behind the surface.

63. A position detecting device having:
a position pointer having a tuning circuit; and
a tablet for position detection having electric wave generating means for generating an electric wave at a frequency equal to the resonance frequency of said tuning circuit, and electric wave detecting means for detecting an electric wave reflected by said tuning circuit,
coordinate values of a position designated with said position pointer on a position detecting section of said tablet being detected by exchange of electric waves between said position pointer and said tablet,
said position detecting device comprising coordinate display means superposed with said tablet for displaying said designated position with coordinates corresponding to said coordinate values, said display means being a transmission type of liquid crystal display unit.

64. A position detecting device having:
a position pointer having a tuning circuit; and
a tablet for position detection having electric wave generating means for generating an electric wave at a frequency equal to the resonance frequency of said tuning circuit, and electric wave detecting means for detecting an electric wave reflected by said tuning circuit,
coordinate values of a position designated with said position pointer on a position detecting section of said tablet being detected by exchange of electric waves between said position pointer and said tablet,
said position detecting device comprising coordinate display means superposed with said tablet for displaying said designated position with coordinates corresponding to said coordinate values, said display means being of a plasma display type.

65. A position detecting device having:
a position pointer having a tuning circuit; and
a tablet for position detection having electric wave generating means for generating an electric wave at a frequency equal to the resonance frequency of said tuning circuit, and electric wave detecting means for detecting an electric wave reflected by said tuning circuit,
coordinate values of a position designated with said position pointer on said tablet being detected by exchange of electric waves between said position pointer and said tablet,
said position detecting device comprising:
coordinate display means for displaying said designated position with coordinates corresponding to said coordinate values; and
a back light for illuminating said display means from below, a reflecting plate for reflecting light emitted from said back light toward said display means disposed over said back light.

66. A position detecting device having:
a position pointer having a tuning circuit; and
a tablet for position detection having electric wave generating means for generating an electric wave at a frequency equal to the resonance frequency of said tuning circuit, and electric wave detecting means for detecting an electric wave reflected by said tuning circuit,
coordinate values of a position designated with said position pointer on said tablet being detected by exchange of electric waves between said position pointer and said tablet,
said position detecting device comprising:
coordinate display means for displaying said designated position with coordinates corresponding to said coordinate values; and
a back light for illuminating said display means from below, said back light being constituted by an electroluminescent element.

67. A position detecting device according to claim 6 wherein said back light is constituted by a cold cathode lamp.

68. A position detecting device according to claim 7 wherein said back light is constituted by a cold cathode lamp.

* * * * *